(12) United States Patent
Riesenweber et al.

(10) Patent No.: US 11,573,555 B2
(45) Date of Patent: *Feb. 7, 2023

(54) TANK CLEANING SYSTEM

(71) Applicant: Veolia Nuclear Solutions, Inc., Westminster, CO (US)

(72) Inventors: Jacob Riesenweber, Richland, WA (US); Matthew Denver Cole, Westminster, CO (US); Scott Martin, Westminster, CO (US)

(73) Assignee: Veolia Nuclear Solutions, Inc., Westminster, CO (US)

( * ) Notice: Subject to any disclaimer, the term of this patent is extended or adjusted under 35 U.S.C. 154(b) by 147 days.

This patent is subject to a terminal disclaimer.

(21) Appl. No.: 17/116,758

(22) Filed: Dec. 9, 2020

(65) Prior Publication Data

US 2021/0089000 A1  Mar. 25, 2021

Related U.S. Application Data

(62) Division of application No. 15/582,176, filed on Apr. 28, 2017, now Pat. No. 10,884,393.

(Continued)

(51) Int. Cl.
| | |
|---|---|
| *B08B 9/087* | (2006.01) |
| *B08B 5/04* | (2006.01) |
| *G05B 19/409* | (2006.01) |
| *G21F 9/34* | (2006.01) |
| *G21F 7/06* | (2006.01) |
| *B08B 13/00* | (2006.01) |
| *B08B 9/093* | (2006.01) |

(Continued)

(52) U.S. Cl.
CPC .............. *G05B 19/409* (2013.01); *B08B 9/08* (2013.01); *B08B 9/087* (2013.01); *B08B 9/0933* (2013.01); *B08B 13/00* (2013.01); *G21F 7/06* (2013.01); *G21F 9/34* (2013.01); *B08B 9/46* (2013.01); *Y02P 90/02* (2015.11)

(58) Field of Classification Search
CPC ......... B08B 9/08; B08B 9/087; B08B 9/0933; B08B 13/00; G05B 19/409; G21F 7/06; G21F 9/34; Y02P 90/02

See application file for complete search history.

(56) References Cited

PUBLICATIONS

Information about Related Patents, Patent Applications, and Patent Office Proceedings.
(Continued)

*Primary Examiner* — Joseph L. Perrin
*Assistant Examiner* — Irina Graf
(74) *Attorney, Agent, or Firm* — FisherBroyles, LLP

(57) ABSTRACT

Systems and methods are disclosed for inspection, maintenance, debris removal, and cleaning of environments that may be difficult to access and hazardous. The system comprises a mast assembly, an arm assembly, a debris removal system, and a drive system. The mast assembly comprises an inner mast and an outer mast having a central axis about which the arm assembly revolves. The arm assembly provides support for the debris removal system. The debris removal system comprises a bucket tool, a plow tool, and one or more hoses for clearing and removing debris. The drive system comprises a plurality of one or more of cables, pulleys, rollers, and hoists to at least one of control motion of the arm assembly, raise and lower the inner mast, and position and control at least one of the bucket tool and the plow tool. The system is at least one of manually or automatically controlled.

19 Claims, 31 Drawing Sheets

Related U.S. Application Data

(60) Provisional application No. 62/330,330, filed on May 2, 2016.

(51) Int. Cl.
*B08B 9/08* (2006.01)
*B08B 9/46* (2006.01)

(56) References Cited

PUBLICATIONS

Information Submitted in Parent Patent Applications see MPEP 609.02.
U.S. Appl. No. 17/116,758, filed Dec. 9, 2020, Veolia Nuclear Solutions, Inc., Tank Cleaning System.
U.S. Appl. No. 15/582,176, filed Apr. 28, 2017, Veolia Nuclear Solutions, Inc., Tank Cleaning System.

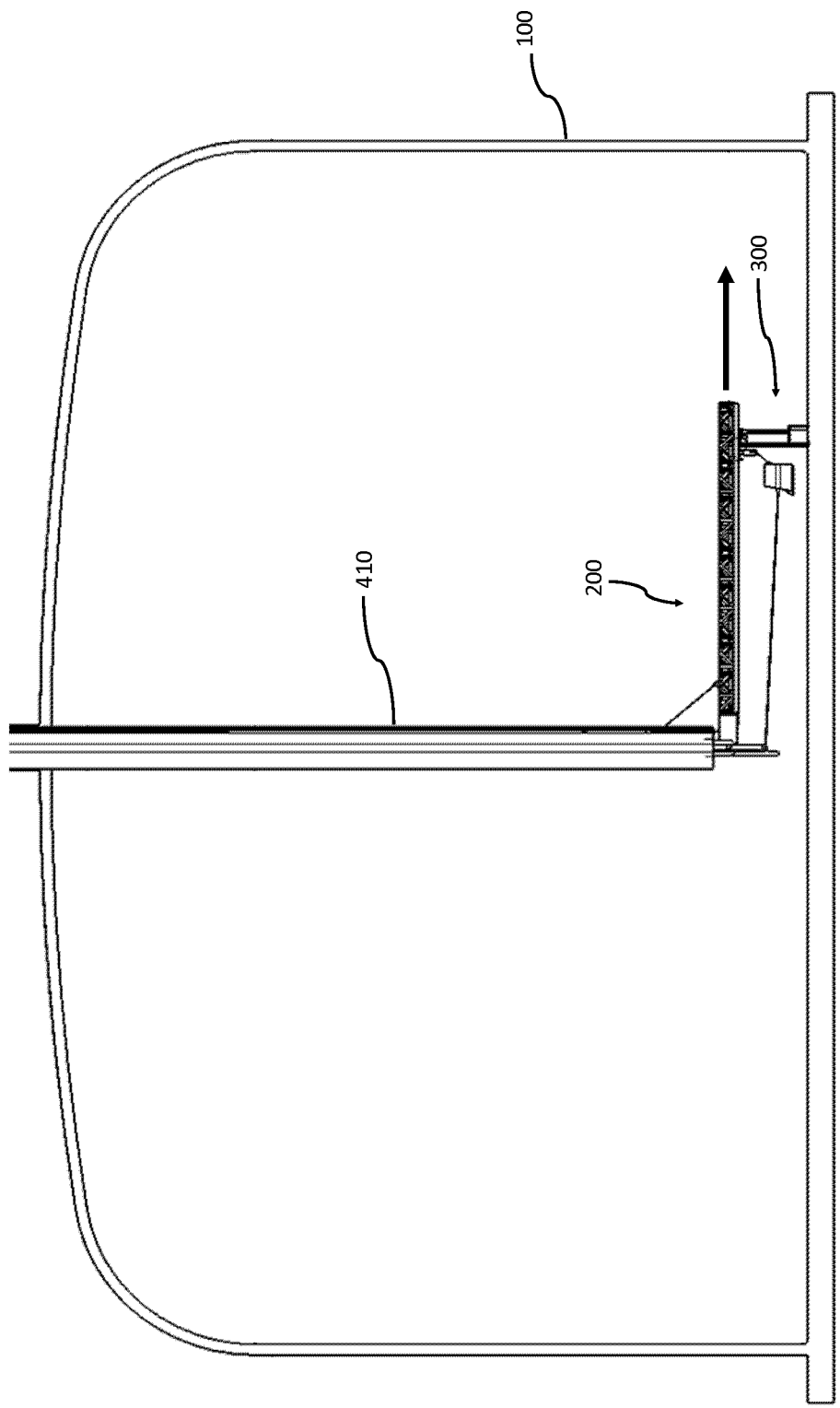

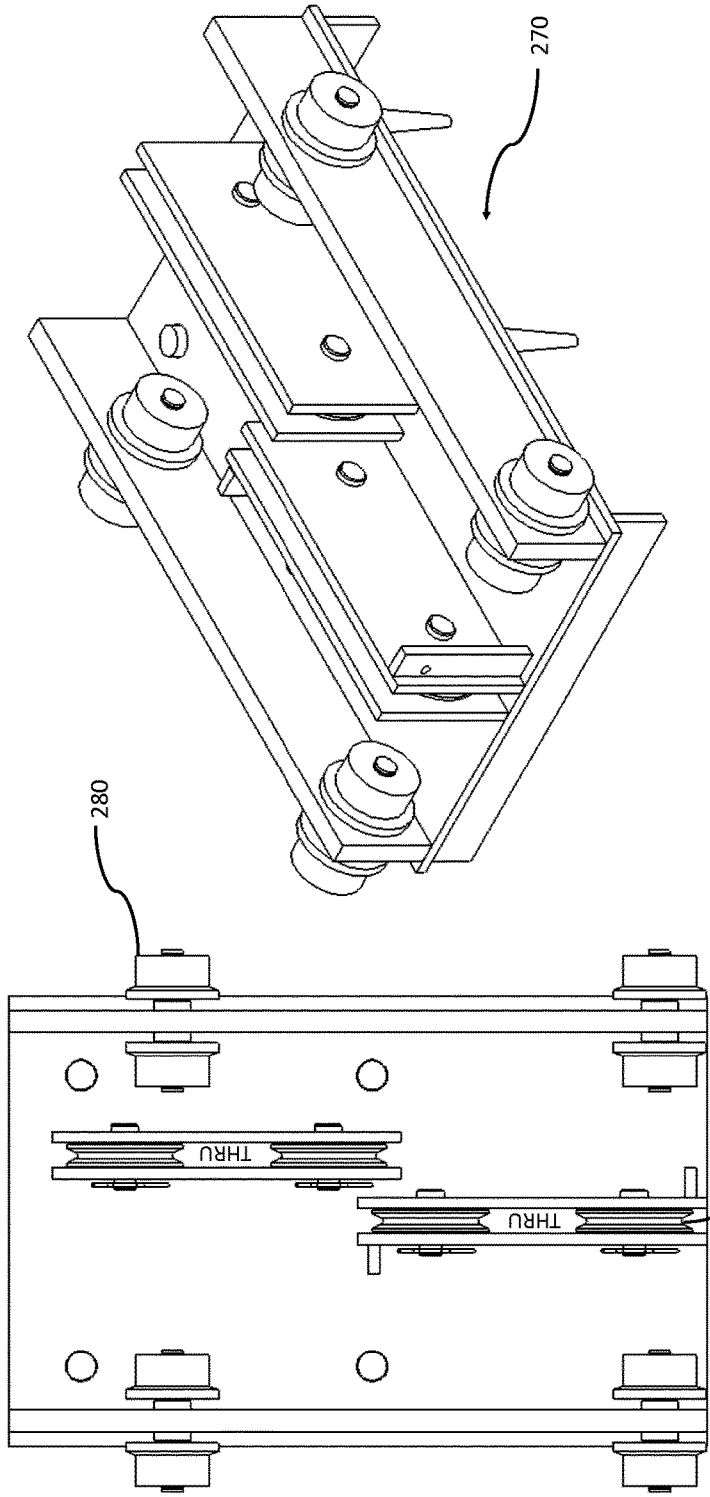
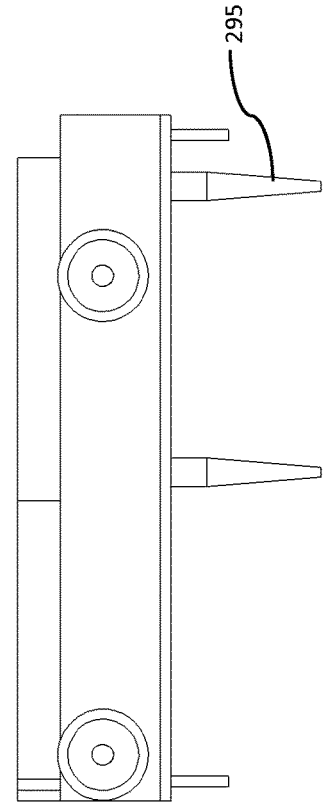

TANK CLEANING SYSTEM

COPYRIGHT NOTICE

Contained herein is material that is subject to copyright protection. The copyright owner has no objection to the facsimile reproduction by anyone of the patent document or the patent disclosure, as it appears in the United States Patent and Trademark Office patent file or records, but otherwise reserves all rights to the copyright whatsoever. The following notice applies to the software, screenshots, and data as described below and in the drawings hereto and All Rights Reserved.

TECHNICAL FIELD

This disclosure relates generally to systems and methods for removing materials from large tanks, particularly large underground nuclear waste tanks.

BACKGROUND

Waste tanks come in many different forms underground, above ground, liquid-submersed or partially buried. The waste tanks may contain nuclear waste, hazardous debris, contaminants, various chemicals and produce dangerous off-gases. These factors would make it unsafe for humans to enter for draining, cleaning, or remediation. In the case of fission material waste storage radiation can destroy electronic components. Robust remote retrieval equipment is needed.

One hundred forty-nine single-shell tanks were constructed at Hanford, Wash. between 1943 and 1964 for the purpose of storing low to high level nuclear waste. These tanks may contain plutonium, uranium, cesium-137, technetium-99, and various other radioactive fissile waste materials and hazardous chemicals. The tanks may also generate toxic vapors which are hazardous to humans and require protective gear to be worn when humans are in proximity. Many efforts have been made to empty these tanks and move the waste into a more secure storage arrangement. A typical method for removing the waste involves injecting liquid into the tank and creating an in-tank slurry sufficiently viscous to be pumped out of the tank. However, many tanks are no longer structurally sound and therefore may leak the injected liquids to the environment. A solution is needed for removing solid waste and sludge from tanks without introducing water or other fluids into the tanks.

Aspects and applications presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112, ¶6. Thus, the use of the words "function," "means" or "step" in the Detailed Description or Description of the Drawings or claims is not intended to somehow indicate a desire to invoke the special provisions of 35 U.S.C. § 112, ¶6, to define the systems, methods, processes, and/or apparatuses disclosed herein. To the contrary, if the provisions of 35 U.S.C. § 112, ¶6 are sought to be invoked to define the embodiments, the claims will specifically and expressly state the exact phrases "means for" or "step for," and will also recite the word "function" (i.e., will state "means for performing the function of . . . "), without also reciting in such phrases any structure, material or act in support of the function. Thus, even when the claims recite a "means for performing the function of . . . " or "step for performing the function of . . . ", if the claims also recite any structure, material or acts in support of that means or step, or that perform the recited function, then it is the clear intention of the inventors not to invoke the provisions of 35 U.S.C. § 112, ¶6. Moreover, even if the provisions of 35 U.S.C. § 112, ¶6 are invoked to define the claimed embodiments, it is intended that the embodiments not be limited only to the specific structure, material or acts that are described in the preferred embodiments, but in addition, include any and all structures, materials or acts that perform the claimed function as described in alternative embodiments or forms, or that are well known present or later-developed, equivalent structures, material or acts for performing the claimed function.

DESCRIPTION OF THE DRAWINGS

A more complete understanding of the systems, methods, processes, and/or apparatuses disclosed herein may be derived by referring to the detailed description when considered in connection with the following illustrative figures. In the figures, like-reference numbers refer to like-elements or acts throughout the figures. The embodiments are illustrated in the accompanying drawings, in which:

FIG. 3D depicts the TCS embodiment of FIG. 3A when the inner mast has been fully extended into the tank.

FIG. 5A depicts a top view of an embodiment of a trolley system.

FIG. 5B depicts an isometric view of an embodiment of the trolley system of FIG. 5A.

FIG. 5C depicts a side view of an embodiment of the trolley system of FIG. 5A.

Figure 1A:
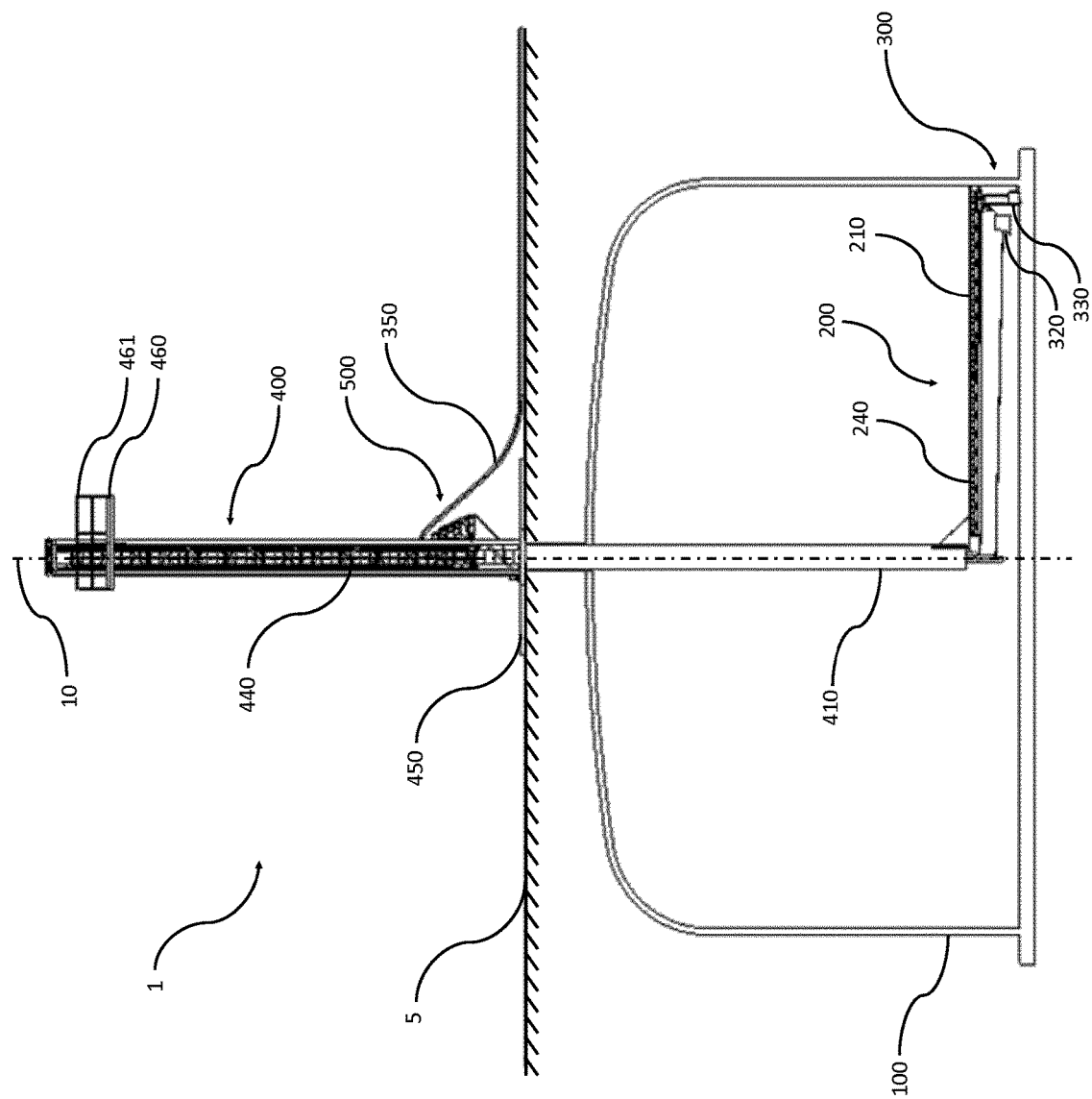
FIG. 1A depicts a front view cross-section of an embodiment of a Tank Cleaning System (TCS) wherein the TCS is fully extended into a tank.

Elements and acts in the figures are illustrated for simplicity and have not necessarily been rendered according to any particular sequence or embodiment.

DETAILED DESCRIPTION

In the following description, and for the purposes of explanation, numerous specific details, process durations, and/or specific formula values are set forth in order to provide a thorough understanding of the various aspects of exemplary embodiments. It will be understood, however, by those skilled in the relevant arts, that the apparatus, systems, and methods herein may be practiced without these specific details, process durations, and/or specific formula values. It is to be understood that other embodiments may be utilized and structural and functional changes may be made without departing from the scope of the apparatus, systems, and methods herein. In other instances, known structures and devices are shown or discussed more generally in order to avoid obscuring the exemplary embodiments. In many cases, a description of the operation is sufficient to enable one to implement the various forms, particularly when the operation is to be implemented in software. It should be noted that there are many different and alternative configurations, devices, and technologies to which the disclosed embodiments may be applied. The full scope of the embodiments is not limited to the examples that are described below.

In the following examples of the illustrated embodiments, references are made to the accompanying drawings which form a part hereof, and in which is shown by way of illustration various embodiments in which the systems, methods, processes, and/or apparatuses disclosed herein may be practiced. It is to be understood that other embodiments may be utilized and structural and functional changes may be made without departing from the scope.

System Overview

The Tank Cleaning System (TCS) is a robotics system that may be used for inspection, maintenance, debris removal, and cleaning of tanks positioned above ground or underground, tanks submersed in water or other liquid medium, and other difficult to access environments. The TCS has many benefits such as limiting hazardous exposure to workers by removing debris from tanks without requiring human entry, the ability to remove debris without injecting water or other fluids into the tank, and a simple mechanical design. In some embodiments the TCS may operate with all electrical and control systems on the outside of the tank, protecting these sensitive parts from degradation due to exposure to hazardous and/or corrosive contaminants that may be present in the tank, as well as allowing the electrical and control systems to be more easily accessible for maintenance operations.

"Tank" as used herein refers generically to any environment in which the TCS may be implemented to perform operations. The terms "site," "tank," "compartment," "hazardous space," "workspace," "area of operations," "confined space," and other such references are merely used to reference a space within which the system may perform operations and are not intended as limitations. Scale and operation of the TCS may vary dependent on the environment in which it is being applied.

Figure 1B:
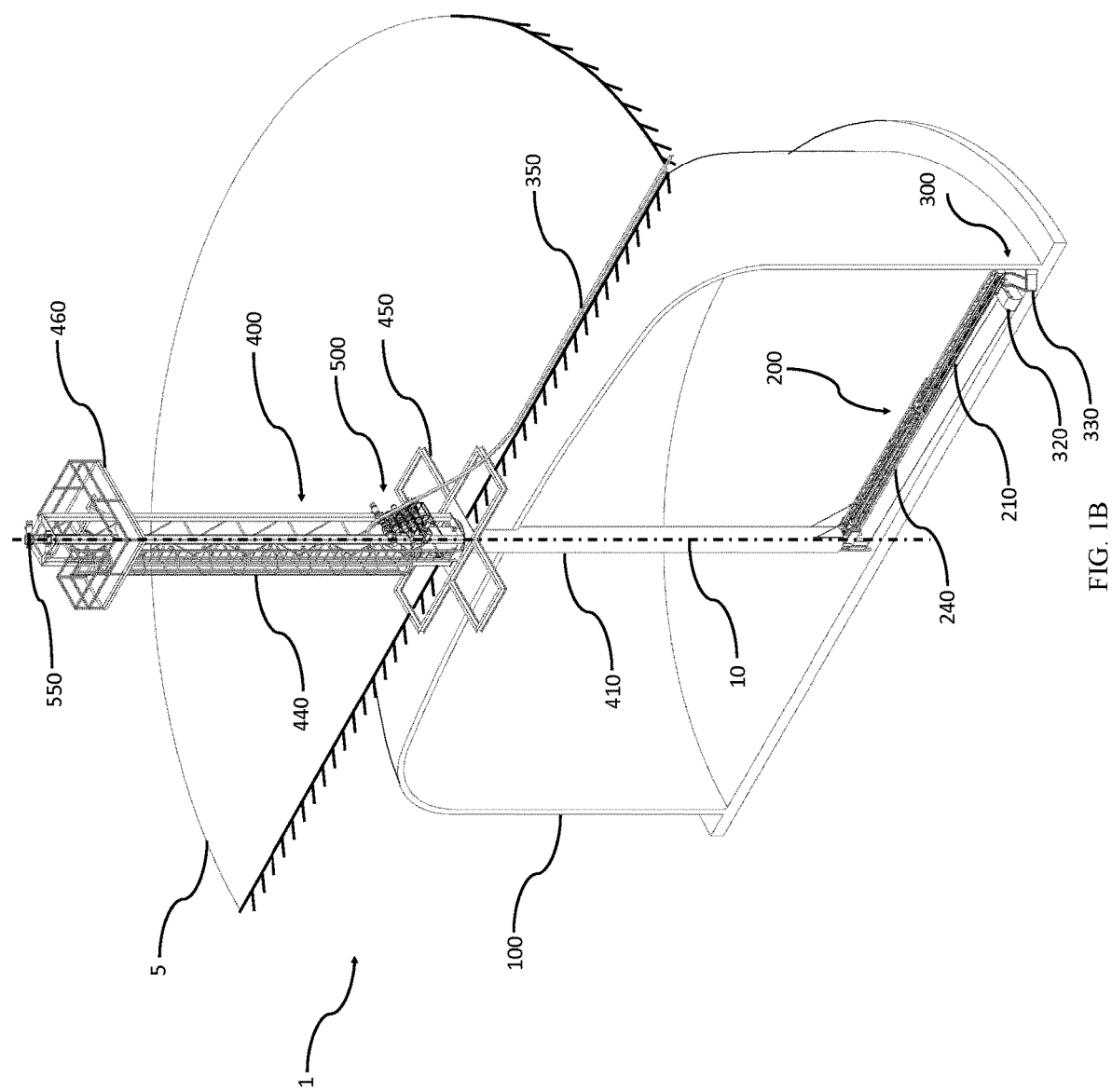
FIG. 1B depicts an isometric cross-section of an embodiment of a TCS wherein the TCS is fully extended into a tank.

FIGS. 1A and 1B depict cross-sections of an embodiment of a Tank Cleaning System (TCS) 1 wherein the TCS 1 is fully deployed into a tank 100. In the depicted embodiment, the tank 100 is buried in the ground 5. Other above-ground or liquid-submersed tank embodiments are possible. The depicted TCS 1 embodiment comprises a mast assembly 400, an arm assembly 200, a debris removal system 300, a drive system 500, and hoses 350. The mast assembly 400 comprises an outer mast 440, an inner mast 410, a work platform 460, and a mast support base 450. The inner mast 410 has central axis 10 about which the arm assembly 200 may revolve. The arm assembly 200 comprises an outer arm 240 and an inner arm 210. In the depicted embodiment, the debris removal system 300 comprises a bucket tool 320 and a plow tool 330. Depending on the application and desired embodiment, other tools are possible. The drive system 500 may comprise one or more motors or hoists which are operable to control one or more drive cables in the system. Some embodiments may further comprise a mast drive system 550 (FIG. 1B) which may be used to control the raising and lowering of the inner mast 410. Other embodiments may comprise more or fewer components as needed for the particular application requirements.

System Operation and Details

FIGS. 2A through 12D depict a particular embodiment or combination of embodiments of the TCS 1. In the depicted embodiment(s), a plurality of hoists, cables, pulleys, and rollers may be employed to facilitate and control motion of the various system components. In some embodiments other mechanical, hydraulic, pneumatic, and/or electrical componentry may be utilized to assist in the motion and control of the various components and systems of the TCS 1.

Mast Assembly

FIGS. 2A through 2D depict an embodiment of the mast assembly 400. The mast assembly 400 provides the primary structural support for the TCS 1 (FIGS. 1A-1B). The depicted mast assembly 400 embodiment comprises an outer mast 440, an inner mast 410, a work platform 460, a mast support base 450, a drive system 500, and a mast drive system 550. In the depicted embodiment, the outer mast 440 remains above ground outside of the tank. The inner mast 410 may telescope from within the outer mast 440 into the tank. In some embodiments, the mast assembly 400 may comprise one or more inner masts 410 that telescope from the outer mast 440. In some embodiments, a slewing ring 470 and slew drive 480 may be coupled to the inner mast 410 and at least one of the outer mast 440 and the mast assembly support base 450 at the base of the mast assembly 400. The slewing ring 470 and slew drive 480 may be used to control rotation of the inner mast 410 about its central axis 10 thereby granting the arm assembly access to the entire tank. The slewing ring 470 also may provide support to the inner mast 410, maintaining its vertical position and preventing it from contacting the bottom of the tank.

Figure 2A:
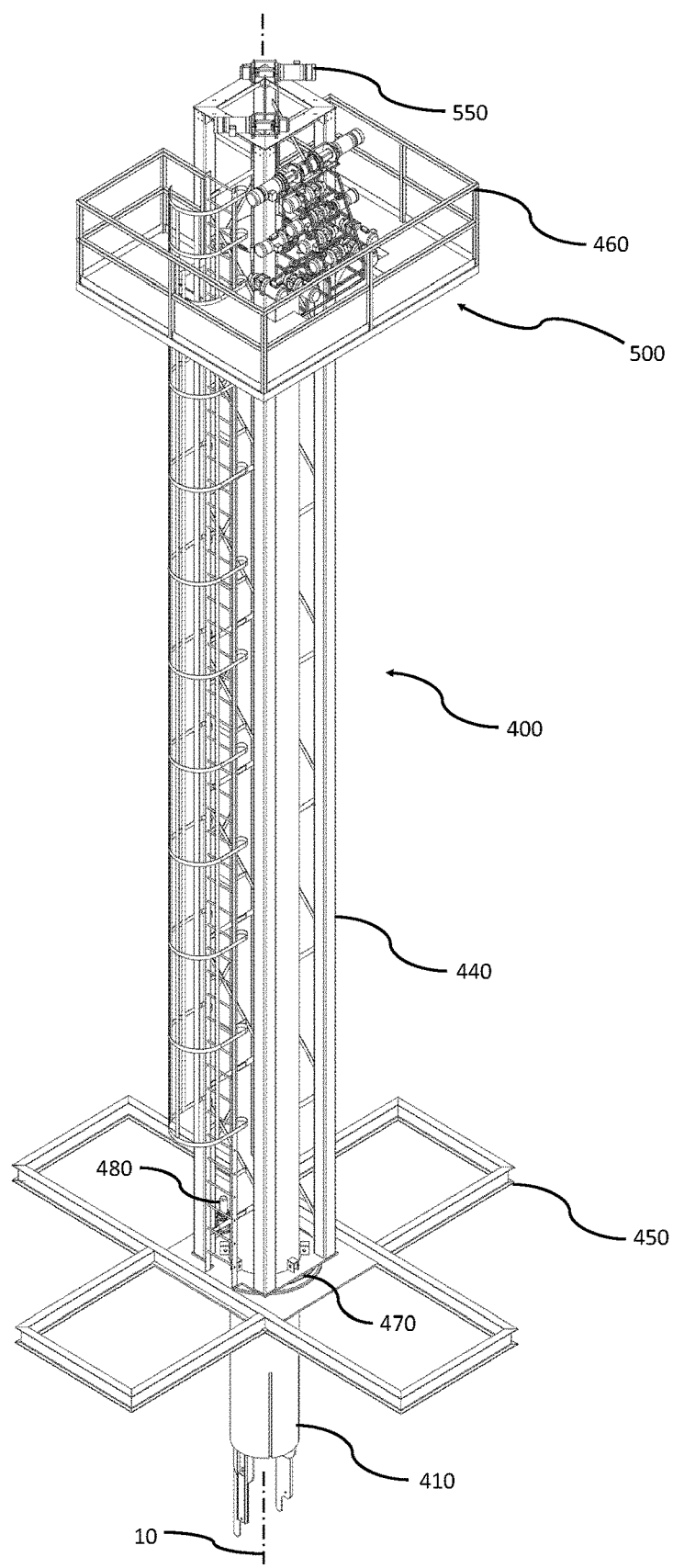
FIG. 2A depicts an embodiment of the mast assembly.
Figure 2B:
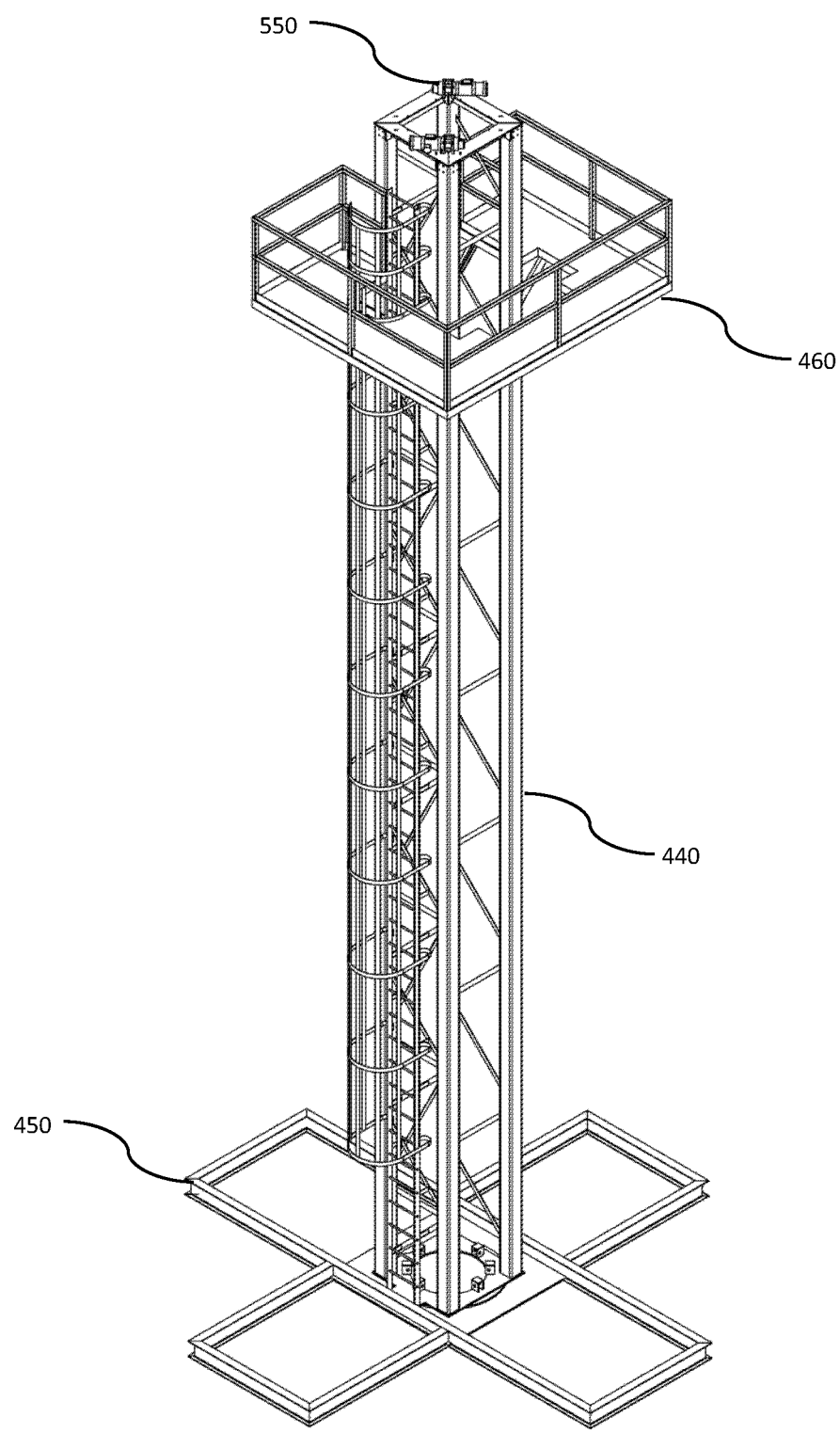
FIG. 2B depicts an outer mast according the embodiment of FIG. 2A.

FIG. 2B depicts an outer mast 440 according the embodiment of FIG. 2A. In the depicted embodiment, the outer mast 440 is a hollow frame which may contain and guide the inner mast 410 (FIG. 2C) such as by rollers and/or rails. In some embodiments, one or more control mechanisms, such as mast drive system 550, may be mounted to the outer mast 440. In an embodiment, a work platform 460 may be mounted to the outer mast 440 and may be used to maintain the drive system 500 while the inner mast 410 is in the raised position and for monitoring operations on-site. Some embodiments may comprise safety netting below and/or along the edges of the work platform railing 461 to prevent workers from falling if they somehow breach the railing 461. Some embodiments may comprise other worker safety mechanisms such as tethers and additional railings.

In the depicted embodiment, the mast assembly support base 450 is used to stabilize the TCS by bracing the TCS against the ground, thereby keeping the mast assembly structure vertical. The mast support base 450 may take a number of forms as necessary to provide the required support and stabilization for the particular application. In the depicted embodiment the mast support base 450 is cross shaped and formed of rectangular beams, reducing weight and cost. Additionally, this "hollow" design provides a clear field of view during deployment of the TCS.

Figure 2D:
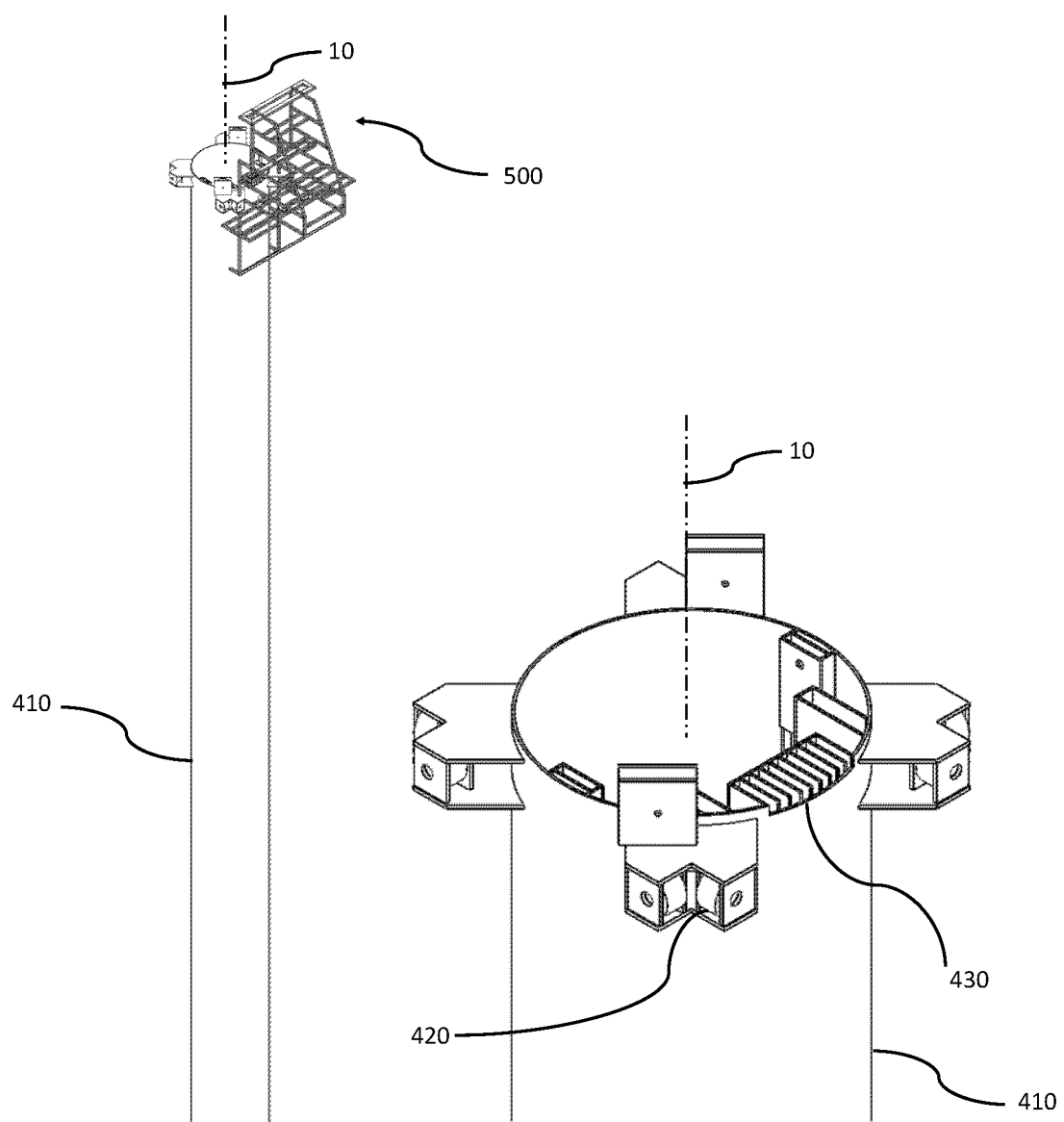
FIG. 2D depicts rollers and cable guides of an inner mast according to the embodiment of FIG. 2A.
Figure 2C:
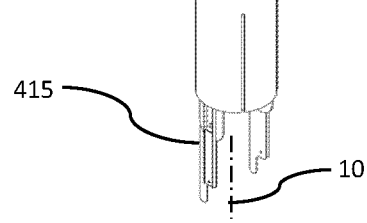
FIG. 2C depicts an inner mast according to the embodiment of FIG. 2A.
Figure 4A:
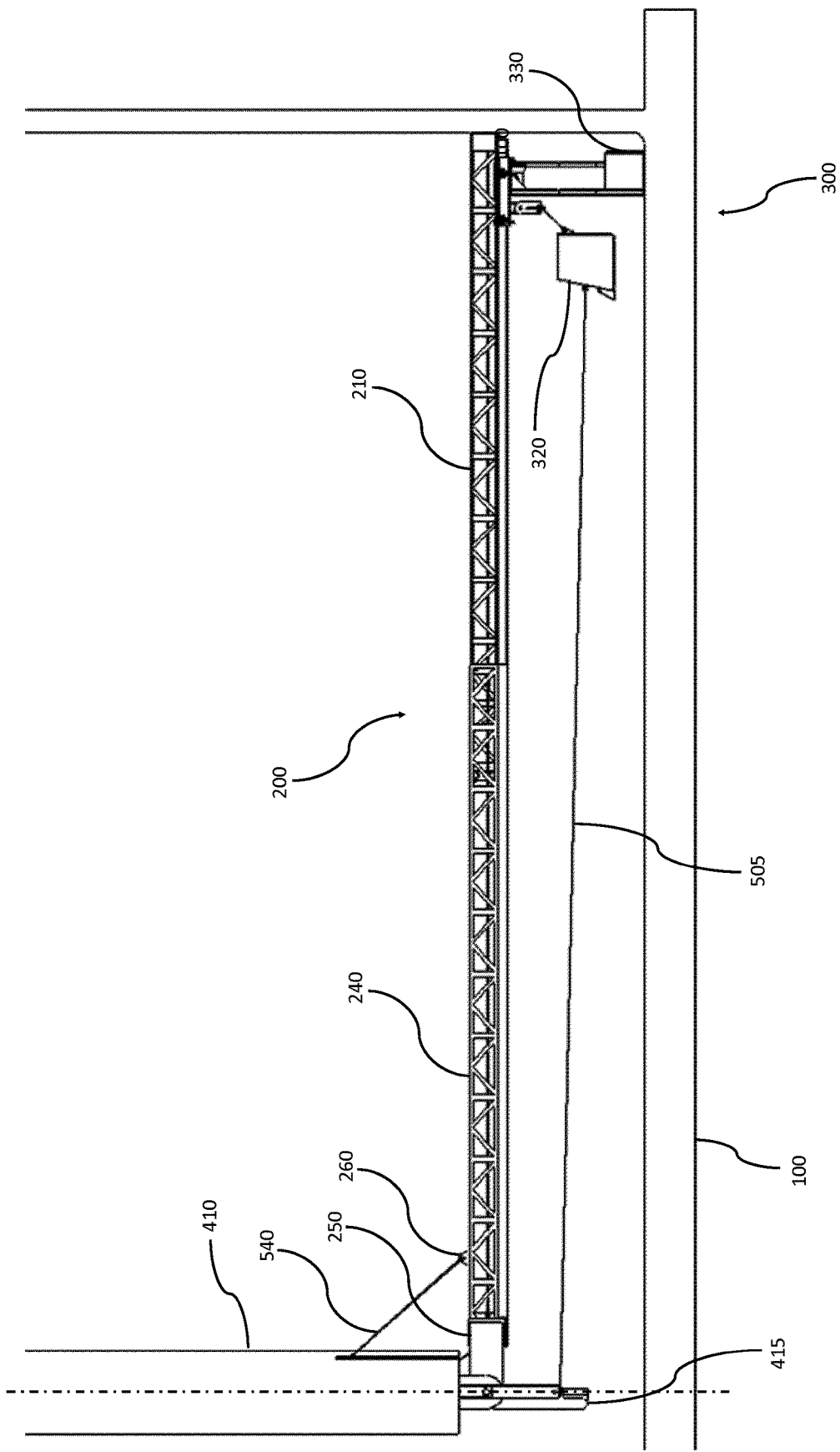
FIG. 4A depicts an embodiment of the arm assembly.

FIGS. 2C and 2D depict an inner mast 410 according to the embodiment of FIG. 2A. In some embodiments the inner mast 410 is generally a hollow tube shape. In some embodiments, the inner mast 410 telescopes down from the outer mast 440 (FIG. 2B) using one or more cables, cable guides, motors, and pulleys. FIG. 2D depicts rollers 420 and cable guides 430 of an embodiment of the inner mast 410. In the depicted embodiment, the inner mast 410 telescopes from the outer mast 440 (FIG. 2B) using a pair of cables, a pair of hoists, and a pair of pulleys that are located directly across from each other to bear the load evenly. In some embodiments, one or more roller systems, each comprising one or more rollers, may interface between the outer mast 440 and the inner mast 410 in order to keep the inner mast 410 aligned and to facilitate motion of the inner mast 410. In some embodiments, the drive system 500 is coupled to the inner mast 410 as depicted in FIG. 2C. In some embodiments, the inner mast 410 fastens to the arm assembly 200 through the coupling of inner mast projections 415 to outer arm projections 250, as shown in FIG. 4A.

In some embodiments, the inner mast 410 may further comprise one or more of a rollerball, contact pole, spike, rollers, bearings, or other supportive device at its base which allow it to rest on the floor of the tank while facilitating rotation and preventing structural damage to the tank. These embodiments may increase structural support for the system and reduce loads and strains on the inner mast 410 and arm assembly during operation. In some embodiments, a portion of the inner mast 410 remains partially above the tank after insertion. In these embodiments, the above-tank portion of the inner mast 410 may serve to barricade the tank opening such that workers and debris cannot fall into the tank opening.

Deployment

Figure 3A:
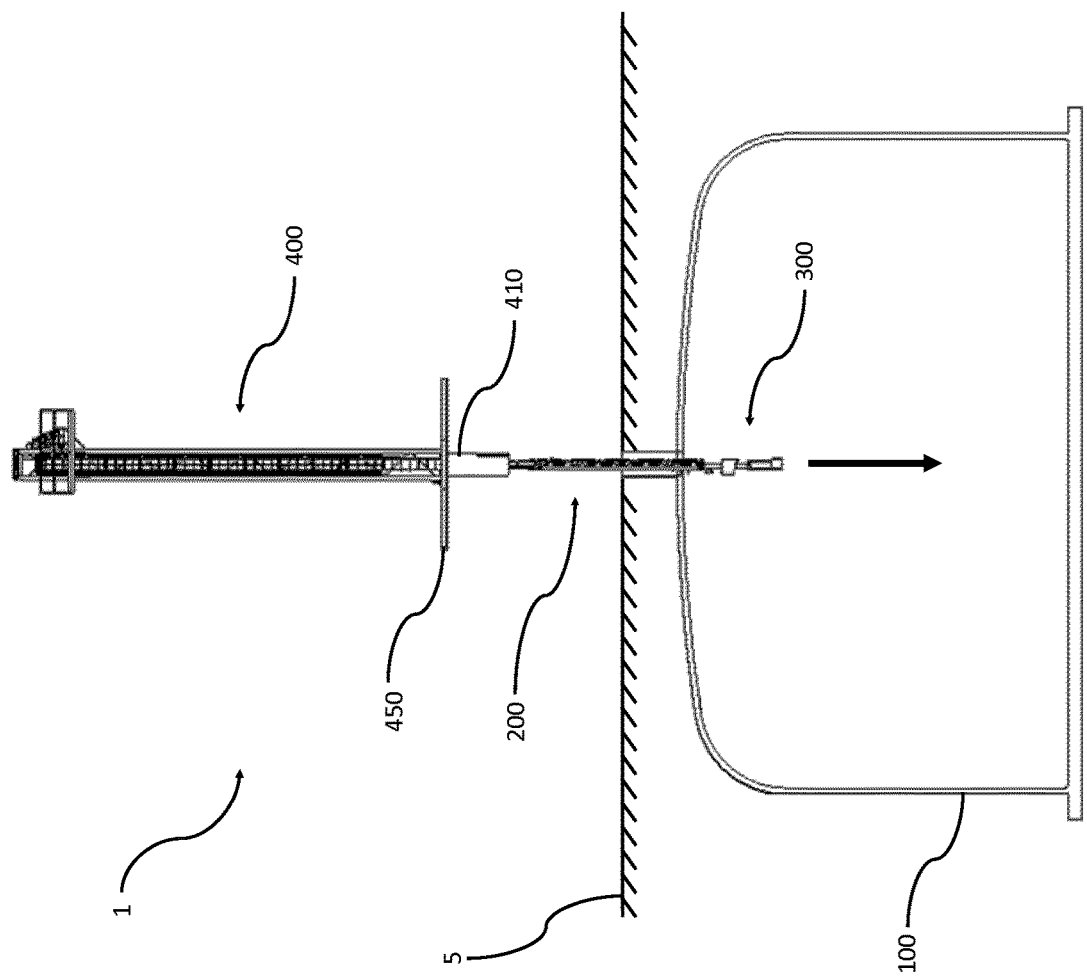
FIG. 3A depicts an embodiment of the TCS at its most compact during insertion into a tank.
Figure 3B:
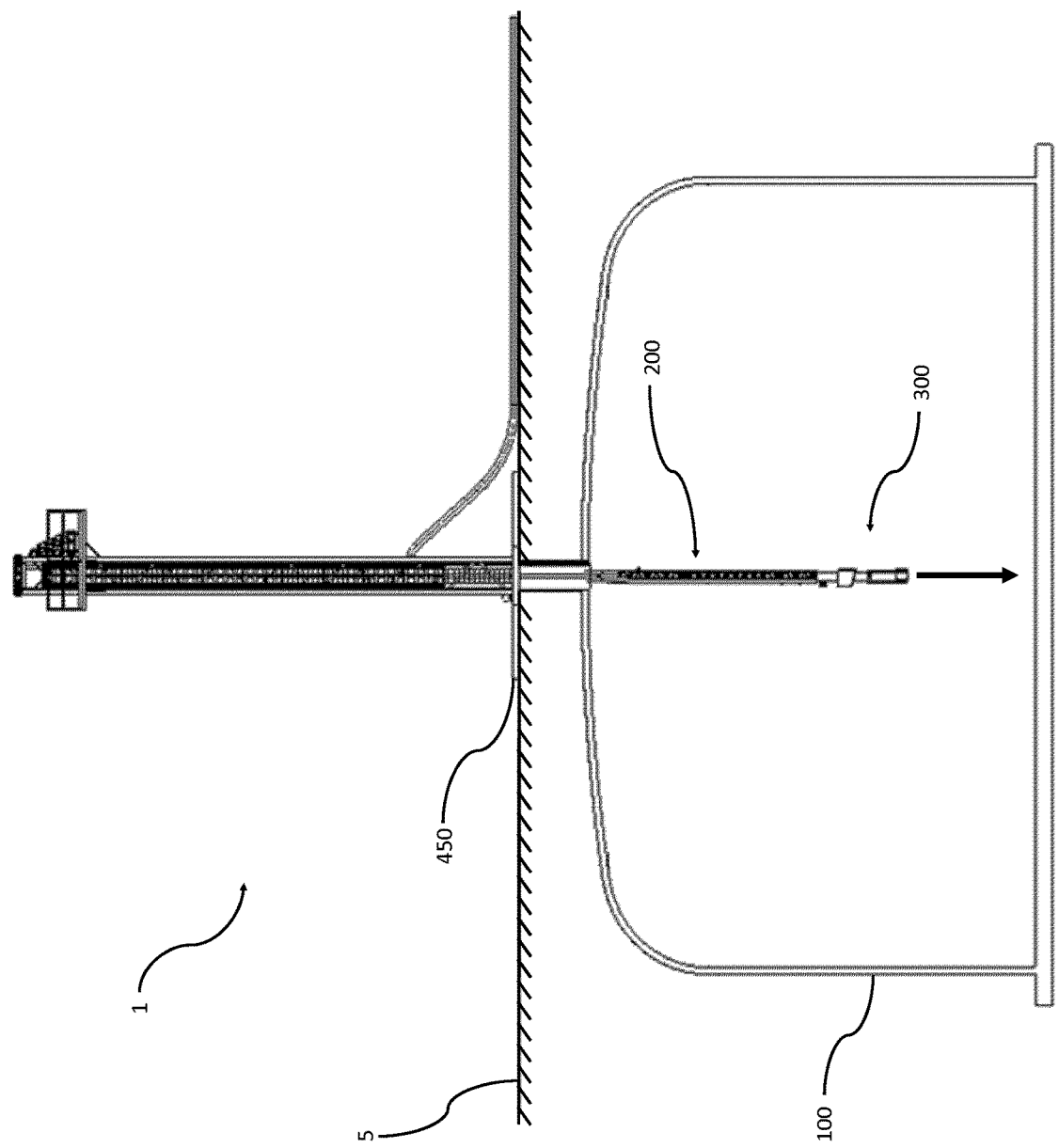
FIG. 3B depicts the TCS embodiment of FIG. 3A when the mast support base is resting on the ground and the arm assembly has been fully inserted into the tank.

FIGS. 3A through 3E depict an embodiment of the TCS 1 being deployed into a tank 100. FIG. 3A depicts an embodiment of the TCS 1 at its most compact, during insertion into a tank 100. In some embodiments the TCS 1 is positioned and lowered into a tank 100 using a crane. Once the TCS 1 is positioned above the tank 100 opening, it may be lowered into the opening. In the depicted embodiment the debris removal system 300 is suspended in-line with the inner mast 410 during insertion. In some embodiments, the arm assembly 200 may be folded upwards against the inner mast 410 during insertion and fold downwards into position once inside the tank 100. In some embodiments, the arm assembly 200 may telescope from within the mast assembly 400. FIG. 3B depicts the TCS 1 embodiment of FIG. 3A when the mast assembly support base 450 is resting on the ground 5 and the arm assembly 200 and debris removal system 300 have been fully inserted into the tank 100.

Figure 3C:
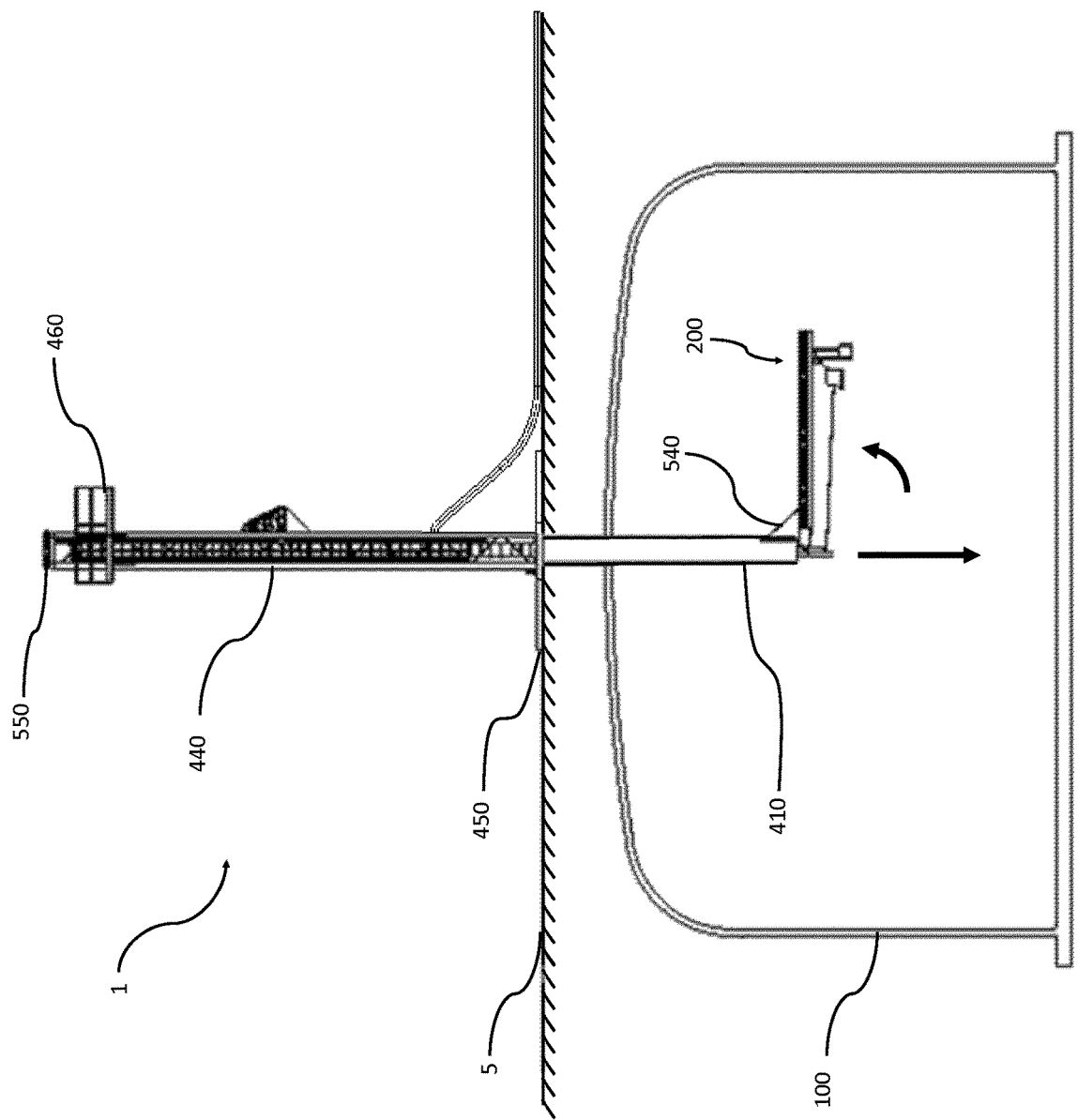
FIG. 3C depicts the TCS embodiment of FIG. 3A when the inner mast is partially extended into the tank and the arm assembly is raised.

FIG. 3C depicts the TCS 1 embodiment of FIG. 3A when the inner mast 410 has been partially extended into the tank 100 and the arm assembly 200 has been lifted into horizontal position. In some embodiments the arm assembly 200 may be lifted into position via cables 540. In some embodiments, the lowering of the inner mast 410 may be controlled by mast drive system 550. In some embodiments the mast drive system 550 is mounted at the top of the outer mast 440 and may be controlled by an operator from the work platform 460.

Figure 3E:
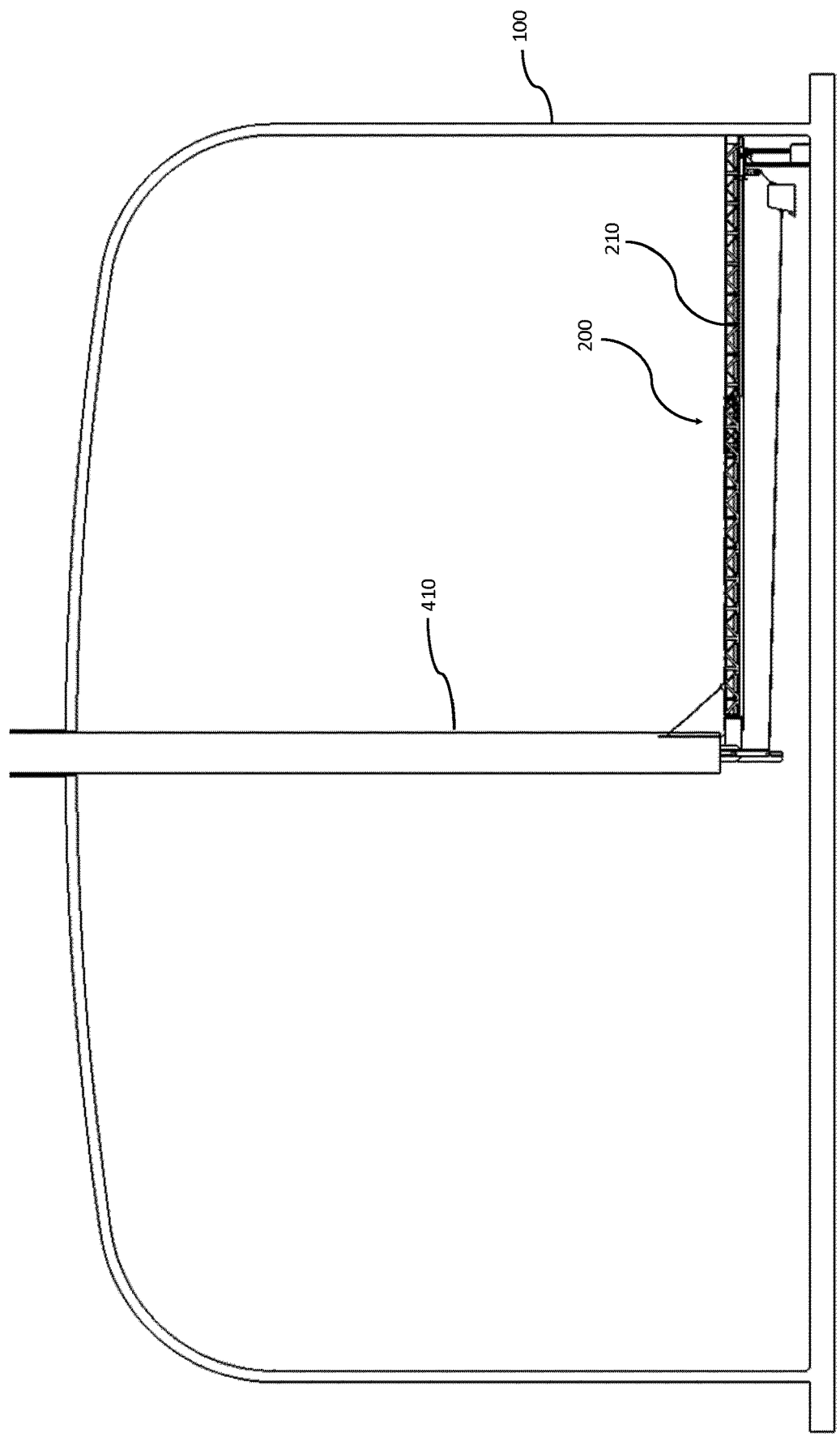
FIG. 3E depicts the TCS embodiment of FIG. 3A when the inner mast and inner arm are fully extended and the TCS is fully deployed in the tank.

FIG. 3D depicts the TCS 1 embodiment of FIG. 3A when the inner mast 410 has been fully inserted into the tank 100 and the arm assembly 200 is at the appropriate height for the operation of the debris removal system 300. FIG. 3E depicts the TCS 1 embodiment of FIG. 3A when the inner mast 410 and inner arm 210 are fully extended and the TCS 1 is fully deployed in the tank 100.

Arm Assembly

Figure 4B:
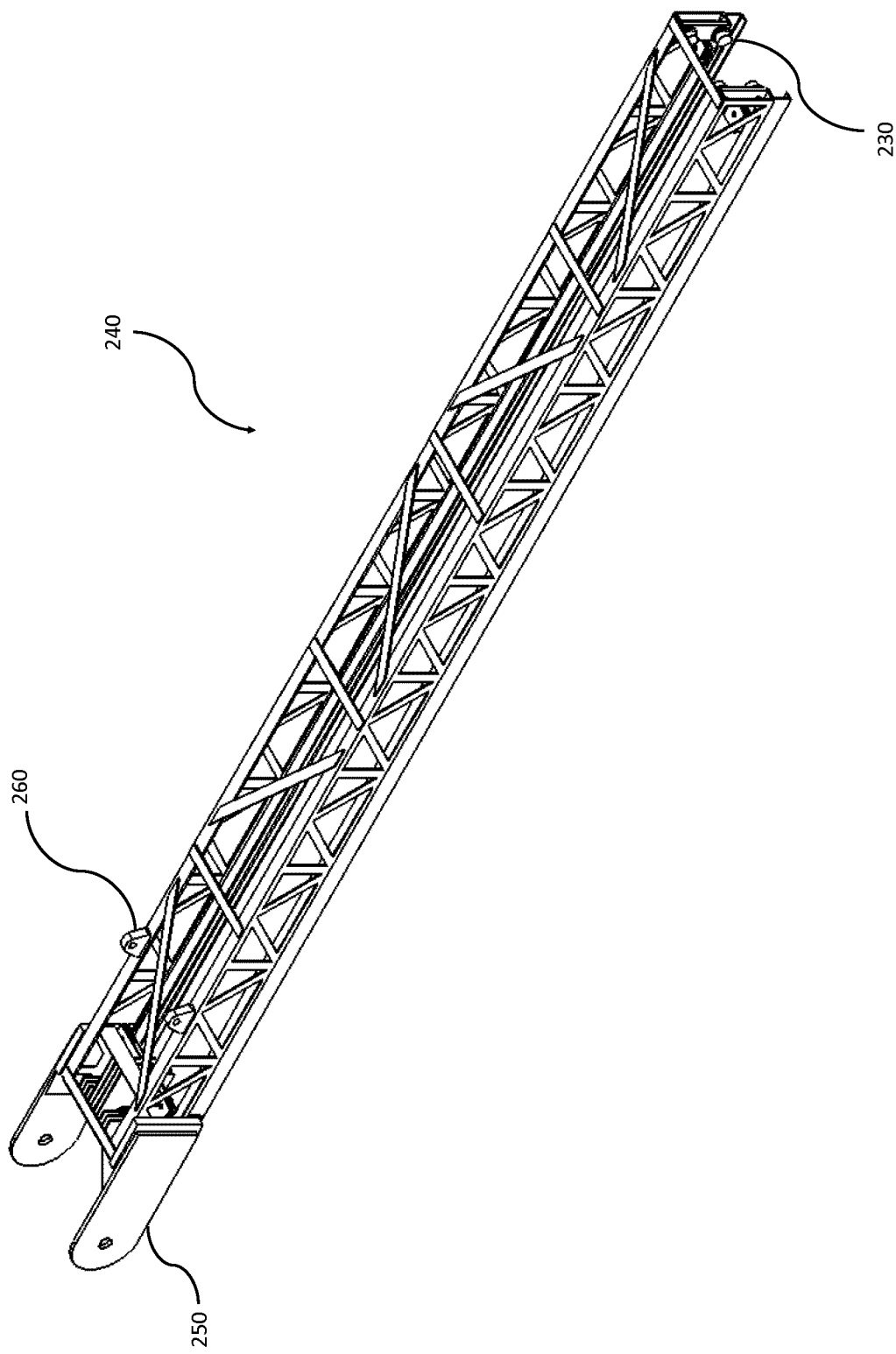
FIG. 4B depicts an outer arm according to the embodiment of FIG. 4A.
Figure 4C:
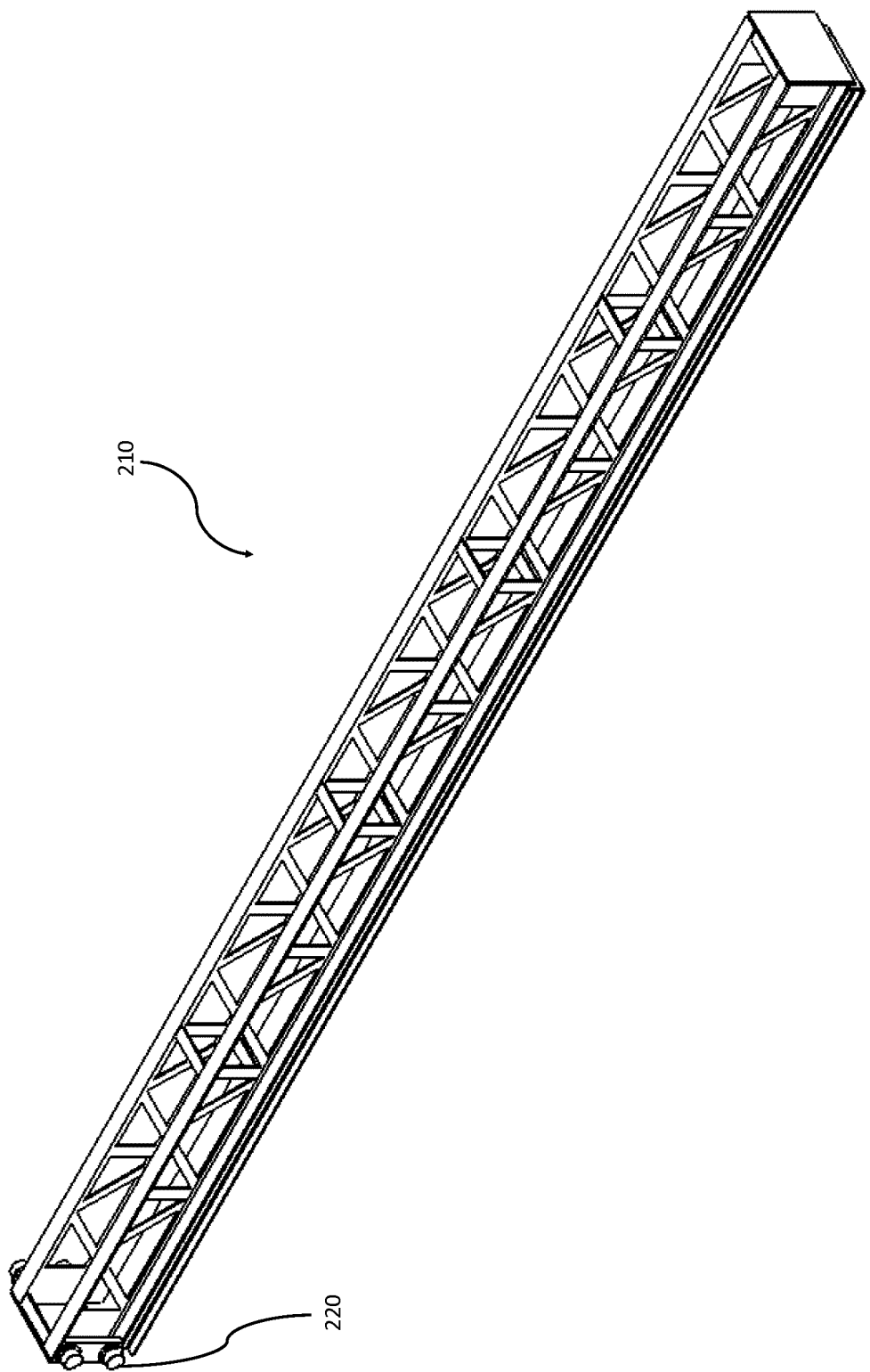
FIG. 4C depicts an inner arm according to the embodiment of FIG. 4A.

FIGS. 4A through 4C depict an embodiment of the arm assembly 200. FIG. 4A depicts a side view of an embodiment of the arm assembly 200. In the depicted embodiment, the arm assembly 200 comprises an outer arm 240 and an inner arm 210. The inner arm 210 telescopes within the outer arm 240 which extends the overall length of the arm assembly 200. In some embodiments, the arm assembly 200 may comprise one or more inner arms 210. In some embodiments, the arm assembly 200 may comprise one or more inner arms 210 that telescope from the outer arm 240. In some embodiments, one or more rollers may interface between the outer arm 240 and the inner arm 210 to facilitate motion during extension and retraction of the inner arm 210. In some embodiments, the extension and retraction of the inner arm 210 may be controlled by one or more cables, pulleys, and hoists.

In some embodiments, the arm assembly 200 may be suspended from the inner mast 410 by one or more cables 540 which connect to the outer arm 240 at cable mounts 260. In some embodiments, the cables 540 used to support the arm assembly 200 may be anchored, fixed, or attached by a winch or other attachment farther up the inner mast 410, and/or further along the arm assembly 200 in order to provide more support and stability for the arm assembly 200. In the depicted embodiment, the arm assembly 200 may be raised or lowered using the one or more cables 540 pivoting about projections 250. In some embodiments the arm assembly 200 may comprise a debris removal system 300 for the transport and removal of debris in the tank 100. In the depicted embodiment the debris removal system 300 comprises a bucket tool 320 and a plow tool 330. The horizontal position of the bucket tool 320 may be controlled by bucket control cables 505, in the depicted embodiment. Projection 415 from the inner mast 410 may be mounted with one or more pulleys through which control cables may be routed, in some embodiments.

In some embodiments, a roller system may be incorporated with the arm assembly 200 that may allow the arm assembly 200 to rest on the tank 100 floor, providing additional structural support and stability. In some embodiments, the roller system may be designed to be deployable as the arm assembly 200 is inserted into the tank 100.

FIG. 4B depicts an outer arm 240 according to the embodiment of FIG. 4A. In the depicted embodiment, the outer arm comprises projections 250, cable mounts 260, and rollers 230. The projections 250 may form part of a hinge or pivot point around which the arm assembly 200 rotates when it is being raised or lowered. In some embodiments, one or more cables may be coupled to the cable mounts 260 and used to raise and lower the arm assembly 200 using one or more of pulleys and hoists. Additionally, the cables may serve to support the arm assembly 200 in position during operations. Rollers 230 may facilitate motion between the inner arm 210 and the outer arm 240, in some embodiments.

FIG. 4C depicts an inner arm 210 according to the embodiment of FIG. 4A. In the depicted embodiment, the inner arm comprises rollers 220 which facilitate motion between the inner arm 210 and the outer arm 240. In some embodiments, the free, or distal, end of the inner arm 210 comprises one or more sections of a material with a high coefficient of friction such that the arm assembly 200 may be pressed up against the wall of the tank and held into place without slipping which may be particularly useful during operations requiring arm stability. Holding the arm assembly 200 securely in place during operations such as scooping may prevent sway which may increase the accuracy of operations. In some embodiments, the free, or distal, end of the inner arm 210 comprises one or more sections of material with a low coefficient of friction such that motion of the arm assembly 200 is not impeded during plowing operations should the arm assembly 200 come in contact with the wall of the tank.

In some embodiments, rollers may be coupled to the free end of the inner arm 210 to facilitate movement and support the arm assembly 200 against the tank 100 wall which may increase stability, reduce arm bending, and support the arm assembly 200 during debris removal operations. In some embodiments, the free end of the inner arm 210 may comprise a flexible cap to protect the walls of the tank from being damaged should the free end of the arm assembly 200 strike the tank during operations.

Trolley System

FIGS. 5A through 5C depict several views of an embodiment of a trolley system 270. FIG. 5A depicts a top view of an embodiment of a trolley system 270, FIG. 5B depicts an isometric view, and FIG. 5C depicts a right side view. In the depicted embodiment, the trolley system 270 comprises pulleys 290 and rollers 280. The rollers 280 facilitate motion between the trolley system 270 and the inner arm 210 or the outer arm 240. In some embodiments, cables or belts may loop around the pulleys 290 and be used to control the operation of the bucket tool 320 (FIGS. 10A-10D) and/or plow tool 330 (FIGS. 8A-8D). Additional cables may be used to move the trolley system 270 with respect to the arm assembly 200 (FIG. 4A). Cabling is described in further detail in FIGS. 7A through 7B. In some embodiments, the trolley system 270 may comprise extrusions 295 on its base that extend through holes on a plow tool base plate 340 (FIG. 8A) as it is seated against the trolley system 270 during system setup.

Debris Removal System

Figure 6:
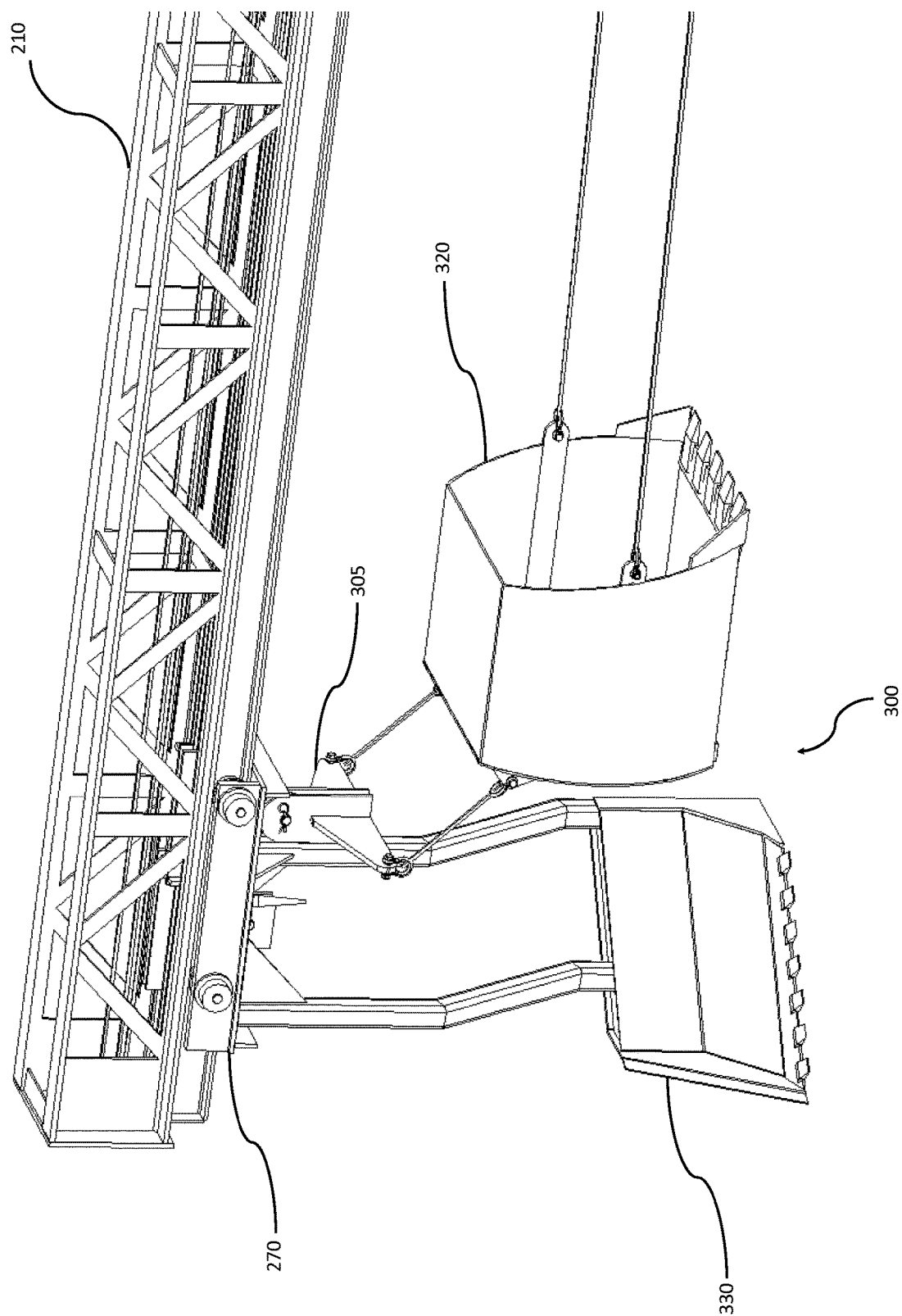
FIG. 6 depicts an embodiment of a debris removal system and tools.

FIG. 6 depicts debris removal tools according to an embodiment of the debris removal system 300. The debris removal tools may comprise a plow tool 330, a bucket tool 320, and a bucket support bar 305, which are shown and described in more detail in FIGS. 8A through 8D and 10A through 11D. Other embodiments may comprise varying quantities of similar or different tools as needed for clearing and removing the debris from the bottom of a tank. In the depicted embodiment, the debris removal tools are attached to the inner arm 210 by a trolley system 270.

Drive System

Figure 7A:
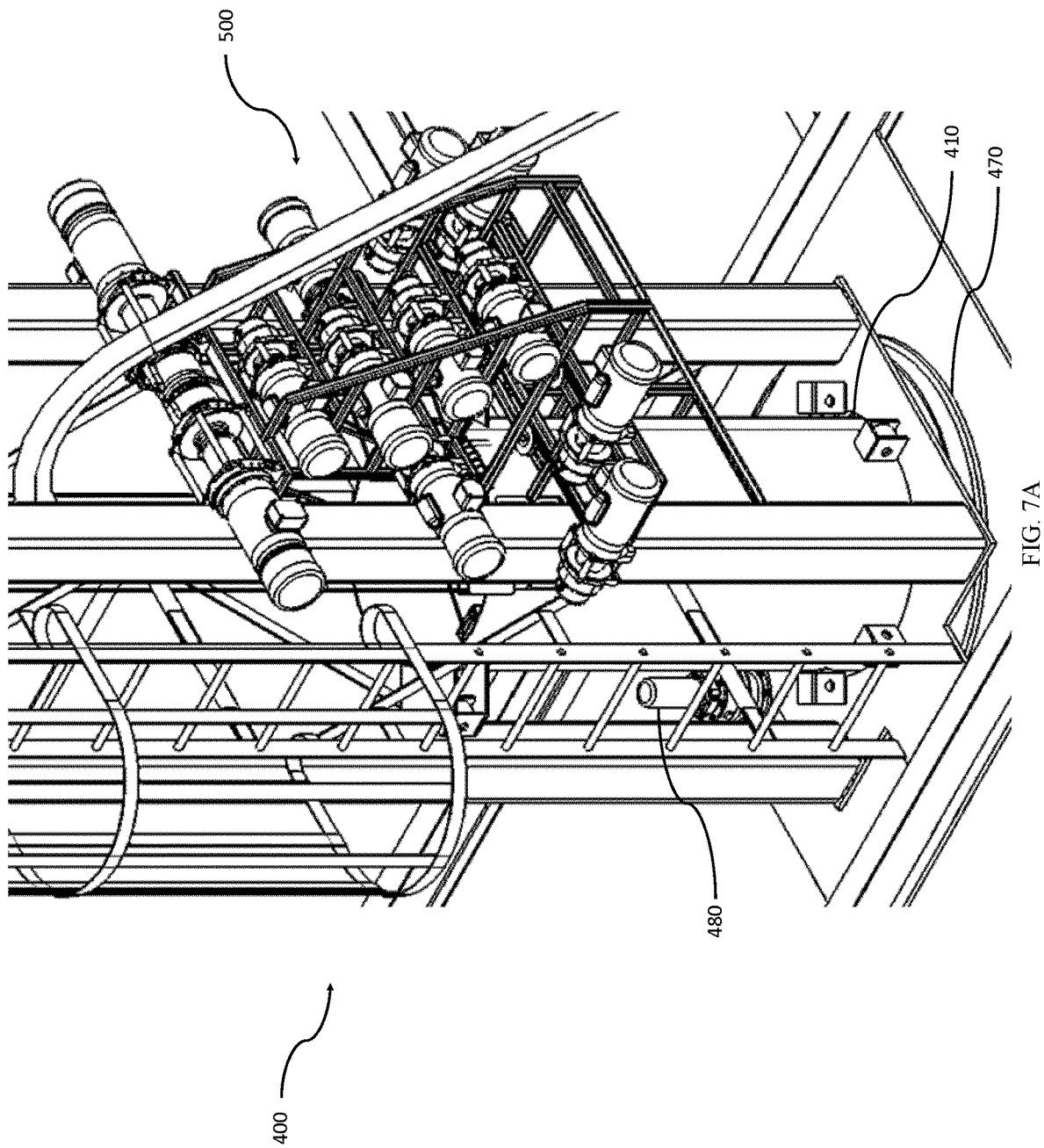
FIG. 7A depicts an embodiment of a mast-mounted cable drive system.

FIG. 7A depicts an embodiment of an above-tank portion of the drive system 500 according to the TCS 1 embodiment of FIGS. 1A and 1B. In some embodiments, the drive system 500 is coupled to the inner mast 410. The drive system 500 may be used to control one or more of the inner mast 410, arm assembly 200 (FIG. 4A-4C), trolley system 270 (FIG. 5A-5C), and debris removal system 300 (FIG. 6). In the depicted embodiment, the drive system 500 comprises one or more hoists, cables, and pulleys. Further control mechanisms may comprise a slewing ring 470 and slew drive 480 at the base of the mast assembly 400 for rotational control, positioning, and support of the inner mast 410. In some embodiments, the drive system 500 may be one or more of electric, pneumatic, hydraulic, or combinations thereof.

Figure 7B:
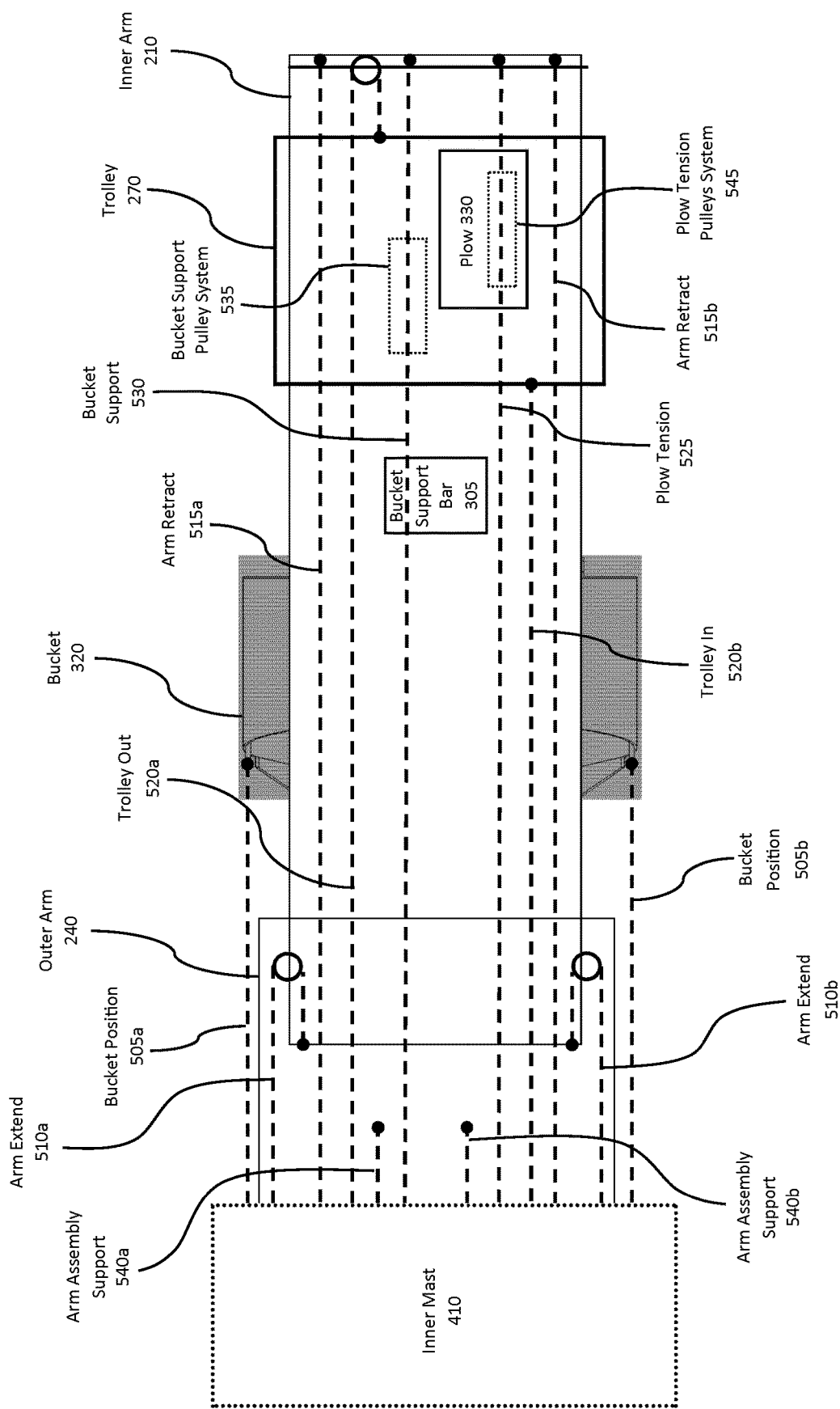
FIG. 7B depicts a top view illustration of an embodiment of the drive cables in the arm and trolley.

FIG. 7B depicts an illustration of an embodiment of drive system control cables in the arm assembly. Closed nodes indicate where cables may be fixed to various components and open nodes indicate pulleys. The pulleys may be horizontal, vertical, and/or angled with respect to the arm assembly.

The inner arm 210 may be extended by retracting arm extend cables 510a,b and simultaneously extending arm retract cables 515a,b. The inner arm 210 may be retracted by retracting arm retract cables 515a,b and simultaneously extending arm extend cables 510a,b. The trolley 270 may be pulled towards the free end of the inner arm 210 by retracting trolley out cable 520a while simultaneously extending trolley in cable 520b. The trolley 270 may be positioned toward the inner mast 410 by retracting trolley in cable 520b while simultaneously extending trolley out cable 520a. The position of the trolley 270 controls position of the debris removal system. In the depicted embodiment, the bucket support pulley system 535 comprises three pulleys. The bucket support cable 530 raises or lowers the bucket support bar 305. In the depicted embodiment, the plow tension pulley system 545 comprises three pulleys and uses the plow tension cable 525 to raise or lower the plow tool 330. In alternate embodiments, one or more pulleys may be used in either pulley system to maneuver the debris removal tools depending on the change of direction and multiplication of force required. The drive system control cables and pulleys are depicted in more detail in FIGS. 7C through 7E. Other embodiments may utilize alternative drive methods.

Figure 7C:
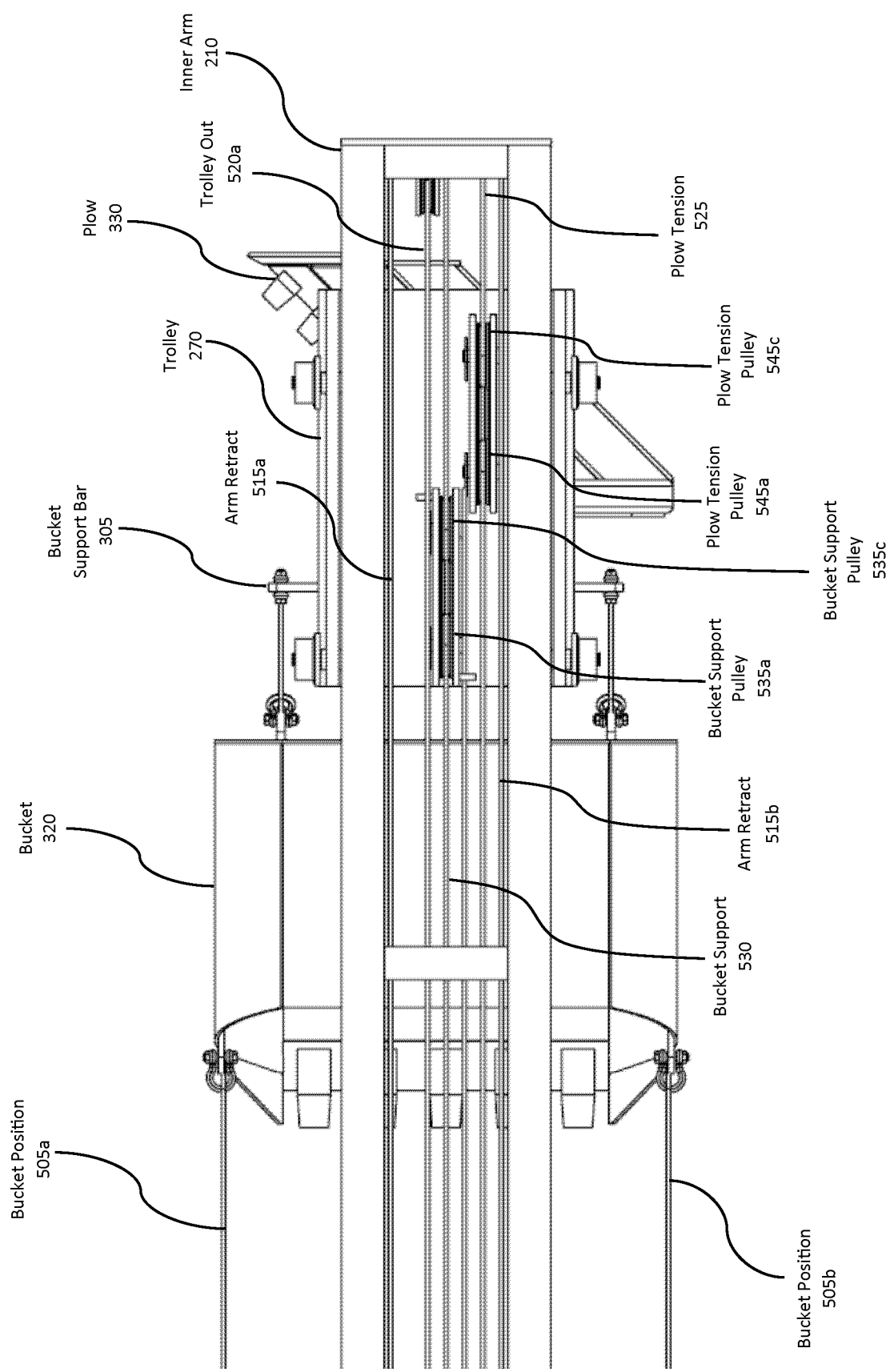
FIG. 7C depicts a top view of the drive cables in the drive system cabling embodiment of FIG. 7B.
Figure 7D:
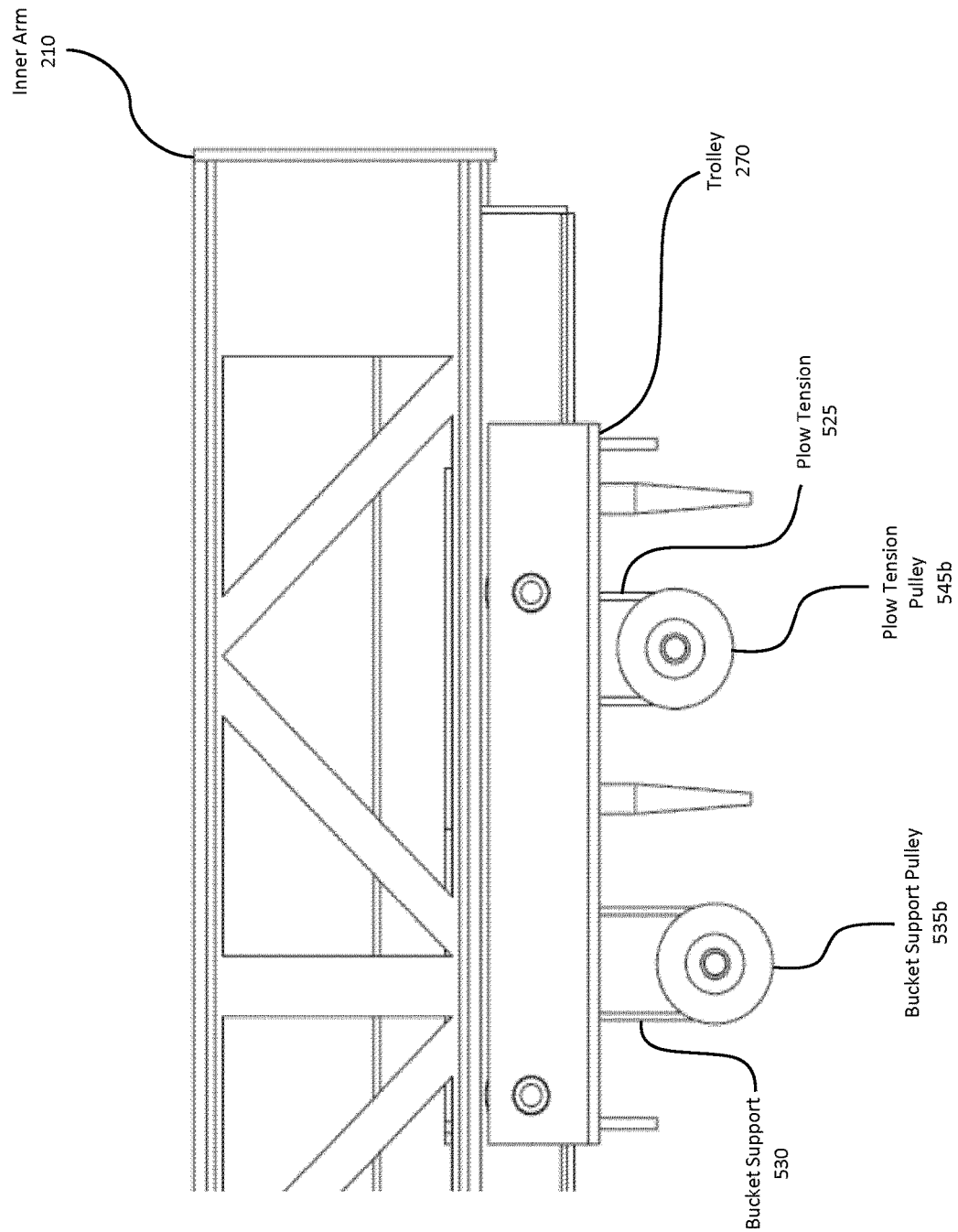
FIG. 7D depicts a side view of the drive cables in the drive system cabling embodiment of FIG. 7B.
Figure 7E:
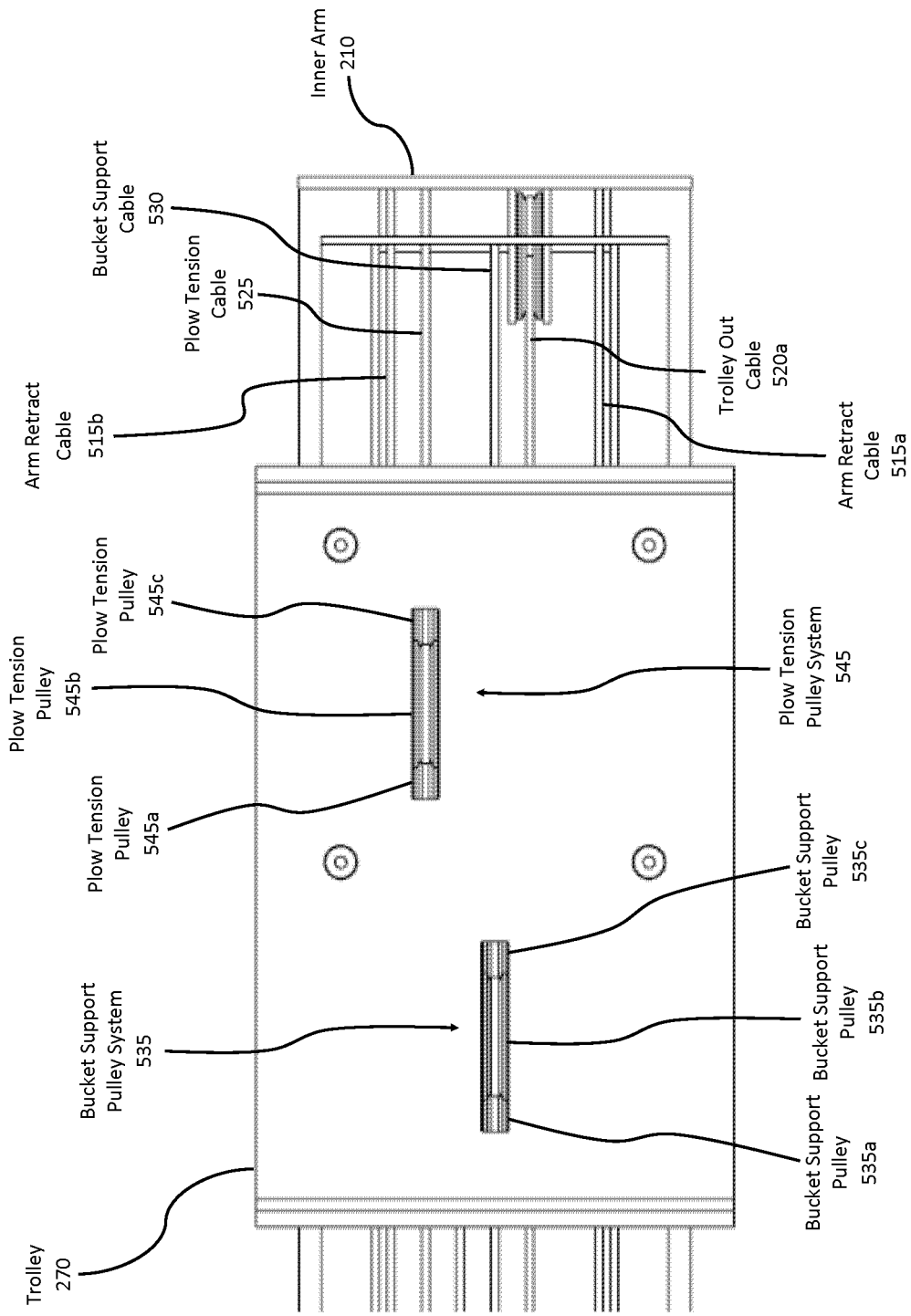
FIG. 7E depicts a bottom view of the drive cables in the drive system cabling embodiment of FIG. 7B.

FIGS. 7C through 7E depict an embodiment of drive system cabling and pulleys in more detail. FIG. 7C depicts a top view of the drive system control cables in the inner arm assembly that may be used to control the inner arm 210 and the debris removal system 300 (FIG. 6). The bucket tool 320 may be pulled toward the inner mast by retracting bucket position cables 505a,b and simultaneously extending bucket support cable 530. The bucket tool 320 may be pulled toward the free end of the inner arm 210 by retracting bucket support cable 530 and simultaneously extending bucket position cables 505a,b. The plow tension cable 525 may be used to position and secure the plow tool 330 to the trolley 270 during system setup.

In the depicted embodiment, the bucket support pulley system 535 (FIG. 7B) is a three pulley system where the end of the bucket support cable 530 that is routed over the bucket support pulley 535c is fixed on the free-end of the inner arm 210 while the other end of the bucket support cable 530 that is routed over the bucket support pulley 535a is controlled by the drive system 500 (FIG. 7A). The plow tension pulley system 545 is a three pulley system where the end of the plow tension cable 525 that is routed over the plow tension pulley 545c is fixed on the free-end of the inner arm 210 while the other end of the plow tension cable 525 that is coupled to the plow tension pulley 545a is controlled by the drive system 500 (FIG. 7A).

FIG. 7D depicts the side view of the inner arm 210 and trolley 270. The bucket support bar, bucket tool, and plow tool are omitted for clarity. The bucket support cable 530 and plow tension cable 525 are used to support and maneuver the bucket tool and plow through the trolley 270 with the use of the bucket support pulley system 535 (FIG. 7B) and the plow tension pulley system 545 (FIG. 7B). The bucket tool may be raised and lowered as the bucket support pulley 535b is pulled up and down against the base of the trolley 270 by retracting and extending the bucket support cable 530. The plow tool may be raised and lowered as the plow tension pulley 545b is pulled up and down against the base of the trolley 270 by retracting and extending the plow tension cable 525. In some embodiments the plow tension cable 525 is only used to initially position the plow during system setup and is kept tensioned throughout operations to hold the plow in position against the trolley 270.

FIG. 7E depicts a bottom view of the inner arm 210 and the trolley 270 shown in FIG. 7D. The bucket support pulley system 535 and the plow tension pulley system 545 are visible through slots in the base of the trolley 270. Bucket support pulleys 535a and 535c and plow tension pulleys 545a and 545c are mounted to the top side of the trolley 270, in the depicted embodiment. Bucket support pulley 535b and plow tension pulley 545b hang below the trolley 270. In the depicted embodiment, the bucket support cable 530 and plow tension cable 525 may be coupled to the free end of the inner arm 210.

Plow Tool

Figure 8B:
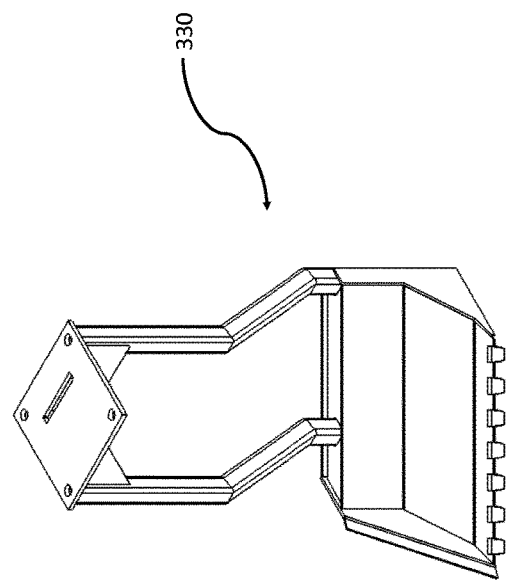
FIG. 8B depicts an isometric view of the plow tool embodiment of FIG. 8A.
Figure 8D:
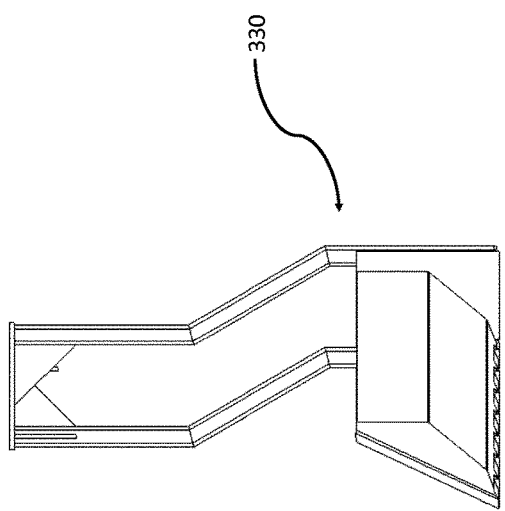
FIG. 8D depicts a right side view of the plow tool embodiment of FIG. 8A.
Figure 8A:
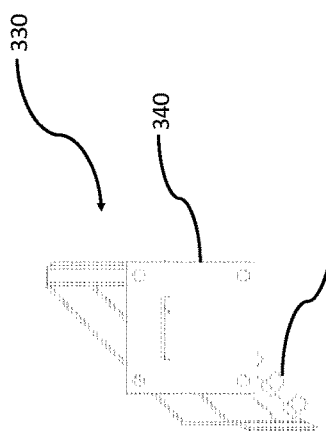
FIG. 8A depicts a top view of an embodiment of a plow tool.
Figure 8C:
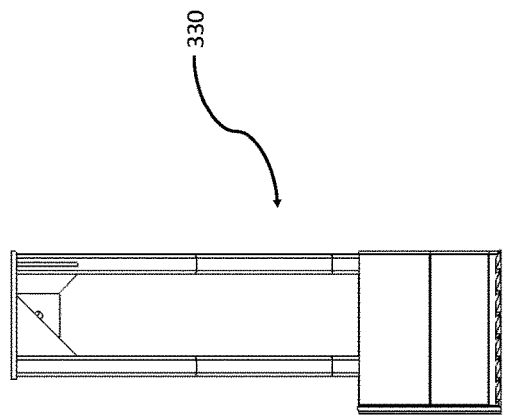
FIG. 8C depicts a front view of the plow tool embodiment of FIG. 8A.

FIGS. 8A through 8D depict several views of an embodiment of a plow tool 330. FIG. 8A depicts a top view of a plow tool 330, FIG. 8B depicts an isometric view, FIG. 8C depicts a front view, and FIG. 8D depicts a right side view. In the depicted embodiment, the plow tool 330 may be coupled to a trolley system 270 (FIG. 6) at a plow tool baseplate 340 using plow tension cable 525 to maintain the connection and trolley extrusions 295 (FIG. 6) to ensure alignment as previously described under the Trolley System heading. In some embodiments, the plow tool 330 may comprise teeth 335 which allow for more effective collection of debris. In some embodiments, the plow tool 330 is used to remove debris from the walls of the tank and move the debris on the floor towards the center of the tank where it can easily be accessed by the bucket tool 320 (depicted in FIGS. 10A-10D). In some embodiments the plow tool may take other forms as required by the type, depth, consistency, and other related characteristics of debris.

Plowing Operations

Figure 9A:
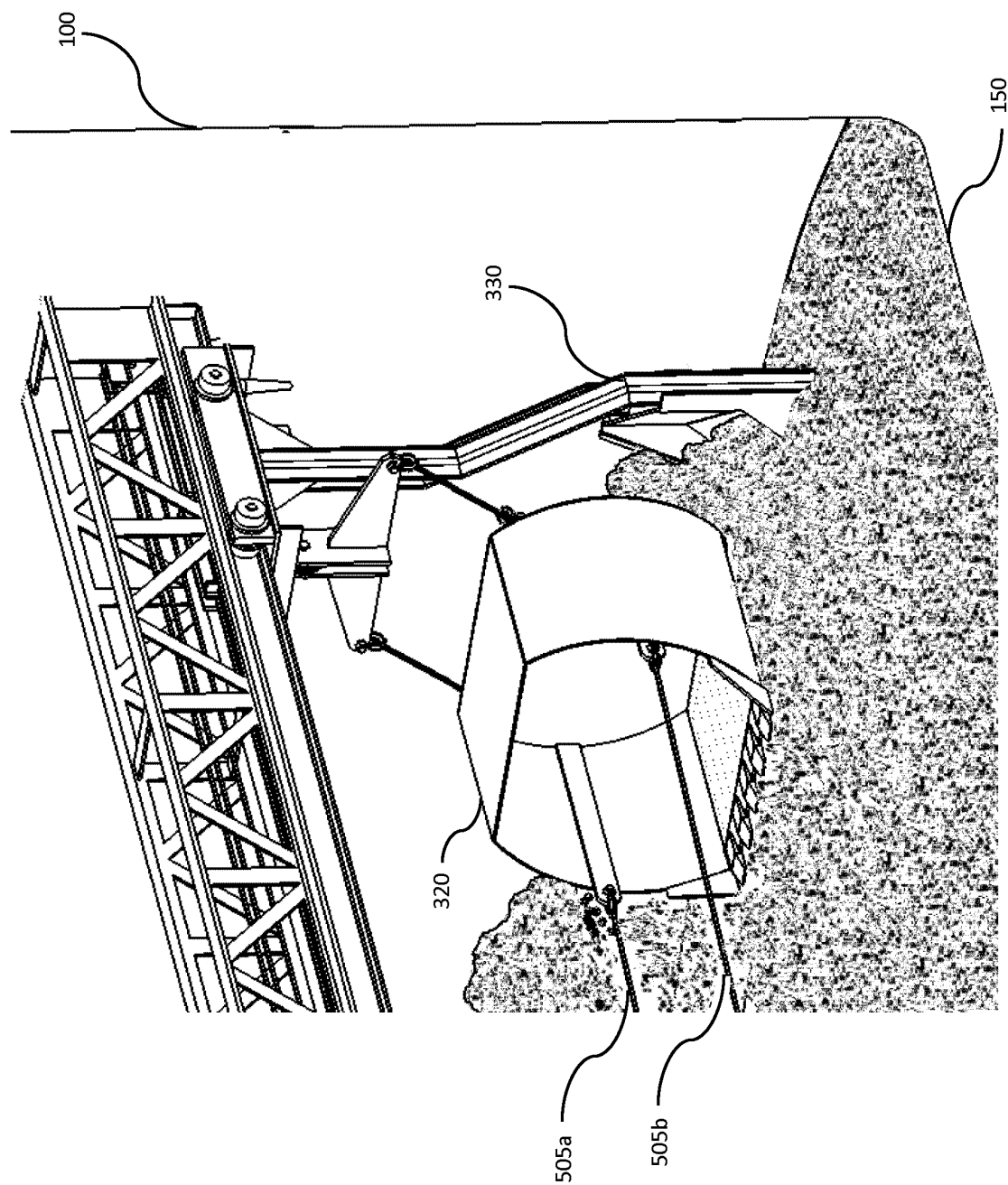
FIG. 9A depicts the plow tool embodiment of FIG. 8A scraping debris buildup from the walls of the tank.
Figure 9B:
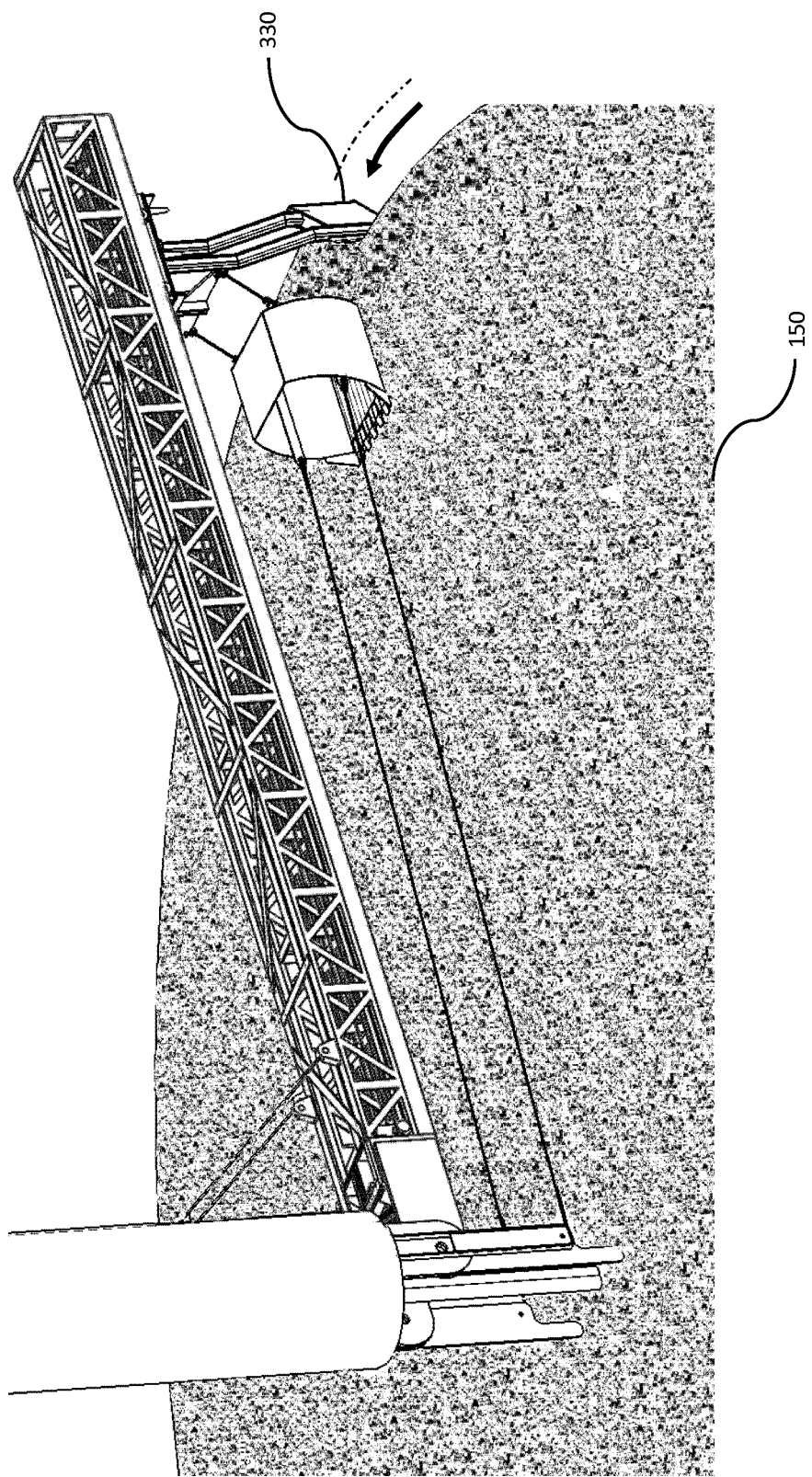
FIG. 9B depicts the plow tool embodiment of FIG. 8A scraping debris from the outside edge of the tank towards the center.

FIG. 9A depicts an embodiment of a plow tool 330 scraping debris 150 buildup from the walls of the tank 100. In the depicted embodiment, the plow tool 330 is used to remove residue and solid debris 150 from the walls of the tank 100 leveling the top of the layer of debris 150 to aid in further clearing and removal operations. The bucket tool 320 may be lifted and maintained above the debris by retracting both bucket support cable 530 (FIG. 6B) and bucket position cables 505a,b during the plowing operations. To move the plow tool 330 around the outside edge of the tank 100, the inner mast is rotated about its central axis 10 (FIG. 1A). FIG. 9B depicts a plow tool 330 according to the embodiment of FIG. 9A scraping debris 150 from the outside edge of the tank floor towards the center of the tank. In some embodiments, this process may be repeated using circular paths of decreasing radius until debris 150 has been cleared a predetermined distance inwards from the tank wall towards the center of the tank 100.

Bucket Tool

Figure 10B:
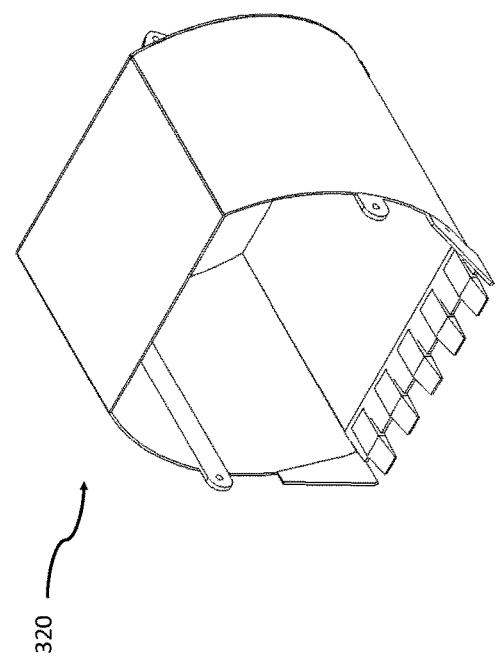
FIG. 10B depicts a front isometric view of the bucket tool embodiment of FIG. 10A.
Figure 10D:
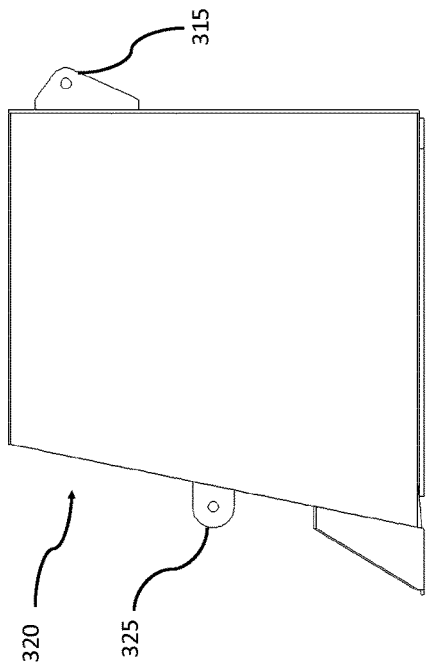
FIG. 10D depicts a right side view of the bucket tool embodiment of FIG. 10A.
Figure 10A:
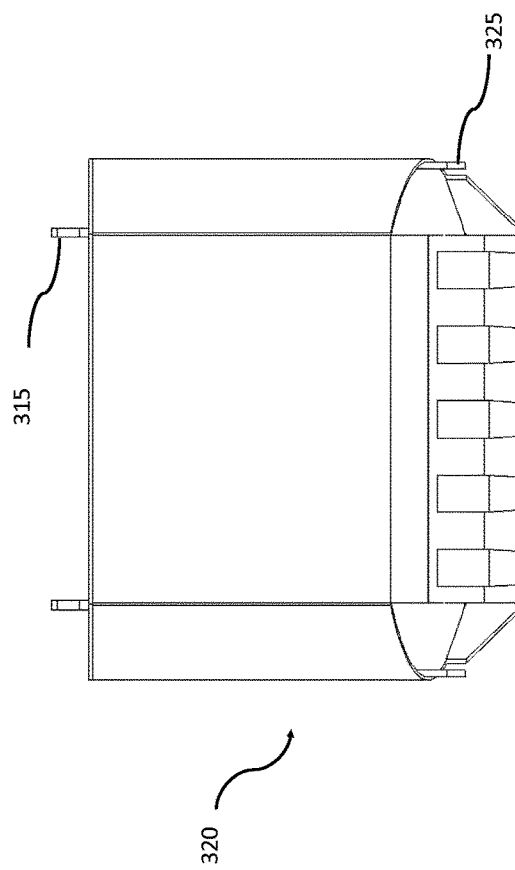
FIG. 10A depicts a top view of an embodiment of a bucket tool.
Figure 10C:
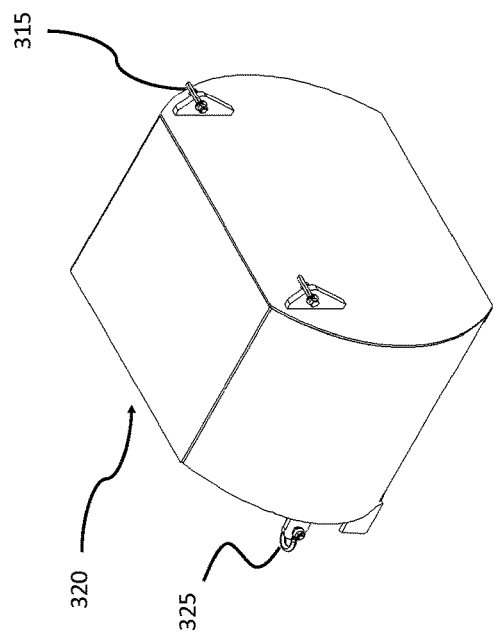
FIG. 10C depicts a rear isometric view of the bucket tool embodiment of FIG. 10A showing cable mounts.

FIGS. 10A through 10D depict several views of an embodiment of a bucket tool 320. FIG. 10A depicts a top view of a bucket tool 320, FIG. 10B depicts a front isometric view of a bucket tool 320, FIG. 10C depicts a rear isometric view of bucket tool 320, and FIG. 10D depicts a right side view of a bucket tool 320. The bucket tool 320 may be used to collect debris from the tank floor. In some embodiments the bucket tool 320 may comprise teeth 335 to allow for more effective scooping of debris. The depicted bucket tool 320 comprises front cable mounts 325 through which the bucket control cables 505a,b (FIG. 6B) may be used to pull the bucket tool 320 towards the inner mast during operation.

The bucket tool 320 may include additional components or be alternately shaped as required by the particular application. In some embodiments, the bucket tool 320 may include a deflector that is larger on one side than the other to aid in guiding the debris in the appropriate direction. Various embodiments of the bucket tool may be interchanged at rear bucket cable mounts 315 and front bucket cable mounts 325 based on the needs and geometry of the tank, materials to be removed, or other site-specific requirements. In some embodiments, the bucket tool 320 may include a method of detecting and/or controlling the volume of debris in the bucket tool 320 during the scooping operation allowing enough room for liquid to be added during sluicing operations and reduce water spillage on the tank floor.

Figure 11:
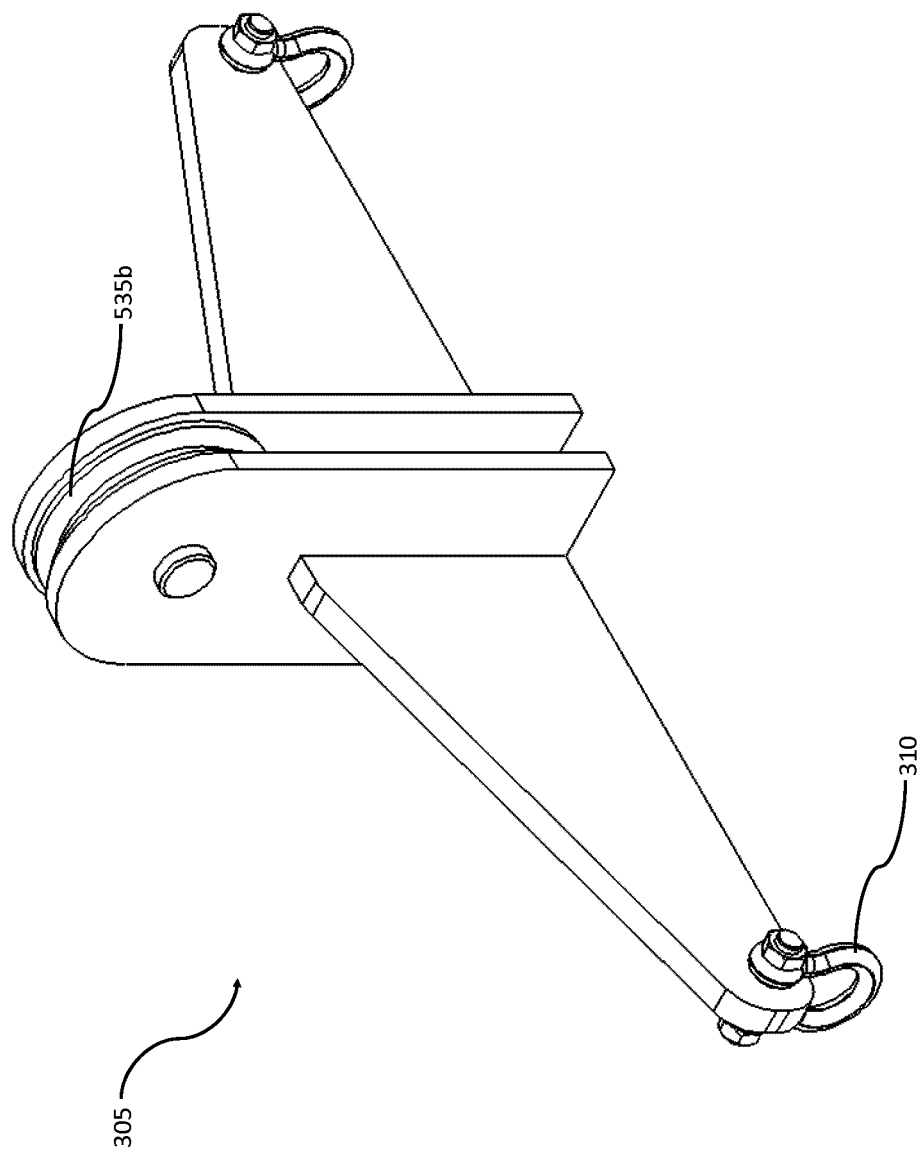
FIG. 11 depicts an isometric view of an embodiment of a bucket support.

FIG. 11 depicts an embodiment of a bucket support bar 305. The depicted bucket support bar 305 embodiment comprises pulley 535b and cable loops 310. In some embodiments, the bucket tool 320 (FIGS. 10A-10D) hangs from the bucket support bar 305 which is coupled to the trolley system 270 (FIGS. 5A-5C) via pulley 535b. One or more cables, chains, links, ropes, or other connectors may be used to connect the bucket tool 320 cable mounts 315 to the cable loops 310. In the depicted embodiment the one or more cables or chains connecting cable mounts 315 to cable loops 310 are fixed length. In some embodiments, the one or more connectors may be alternatively attached and aid in controlling the motion of the bucket tool 320. Alternate coupling mechanisms are possible.

Removal

FIGS. 12A through 12D depict an embodiment of debris removal in a tank using the TCS embodiment depicted in FIG. 1 and the bucket tool 320 embodiment depicted in FIGS. 10A through 10D.

Figure 12A:
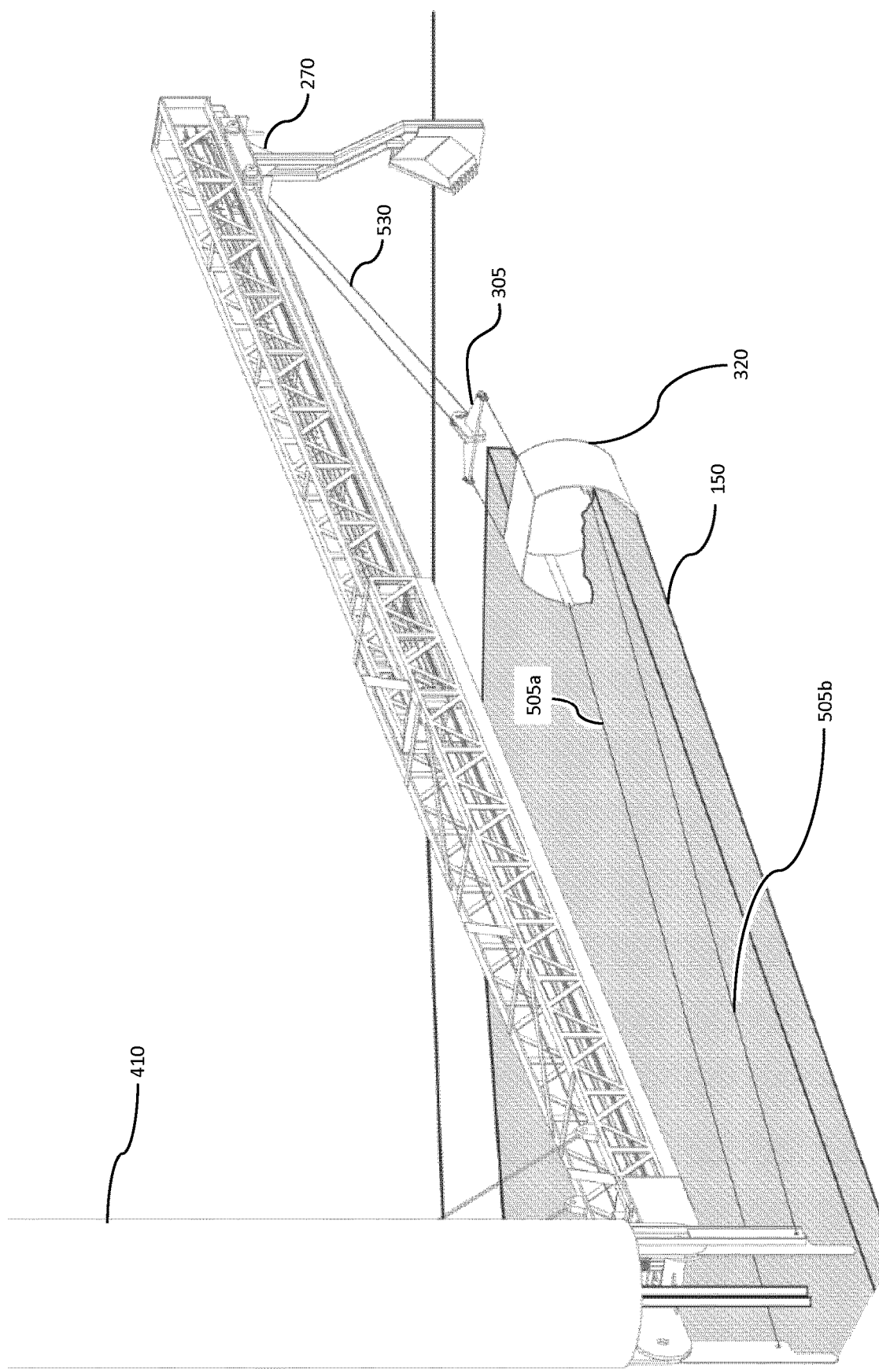
FIG. 12A depicts an embodiment of the bucket tool embodiment of FIG. 10A scooping a section of debris.

FIG. 12A depicts the bucket tool 320 scooping debris 150 from the tank. In the depicted embodiment, the bucket tool 320 is acted upon by bucket control cables 505a,b to move toward the inner mast 410 at the center of the tank. While traveling radially inward along this path, the bucket tool 320 scoops and retains a section of debris 150. In some embodiments, after the bucket tool 320 has reached capacity, it may be pulled up until the underside of the bucket tool 320 is raised above the general level of the debris 150 to avoid gathering more debris 150 before reaching the center of the tank. The height of the bucket may be controlled by bucket support cable 530 which connects the bucket support bar 305 to the trolley 270, in some embodiments.

Figure 12B:
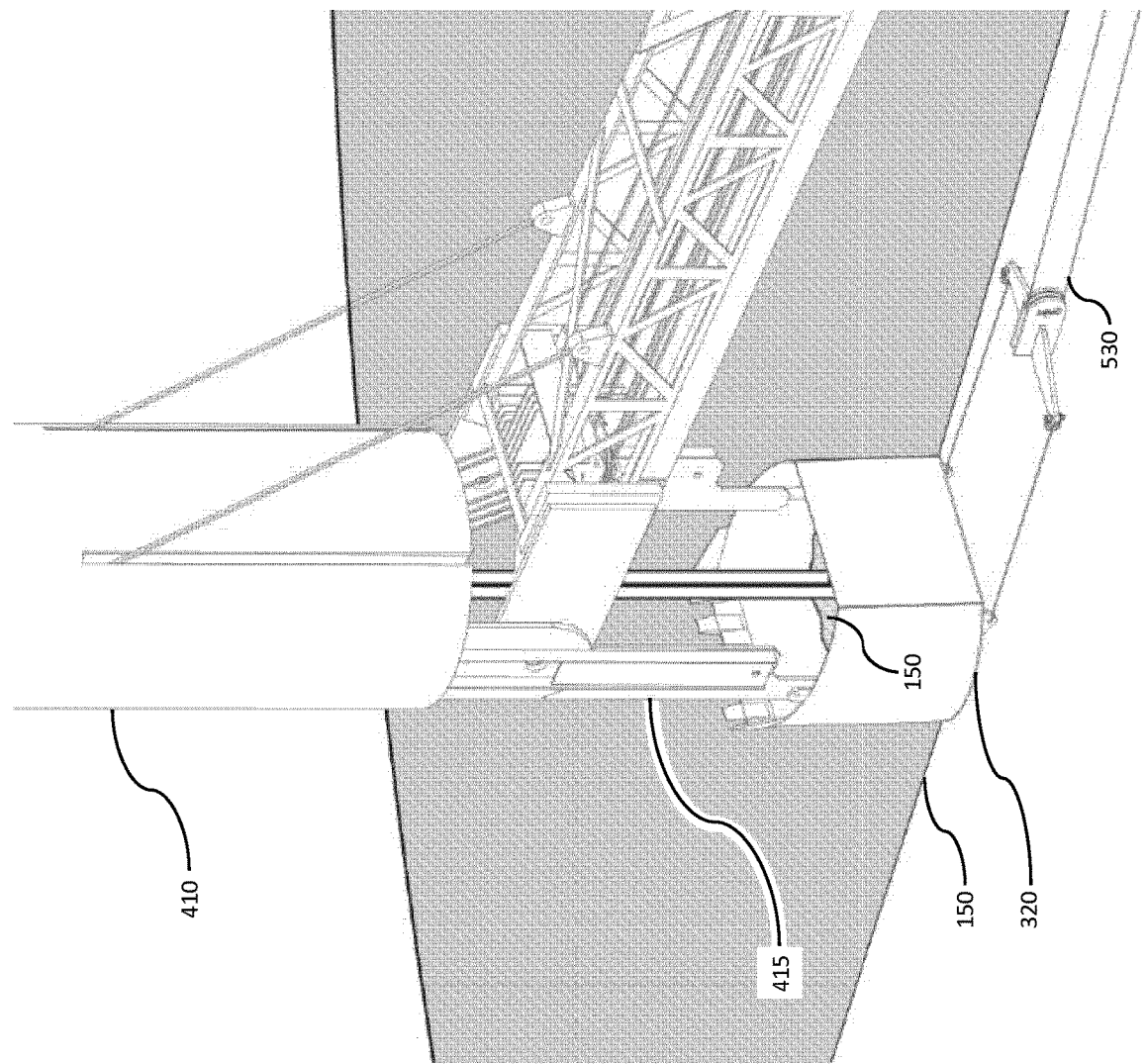
FIG. 12B depicts the bucket tool embodiment of FIG. 10A as it is being tilted upright at the center of the tank.

FIG. 12B depicts the bucket tool 320 as it is being tilted upright at the center of the tank. When the bucket tool 320 reaches the center of the tank it may be tilted upright beneath the inner mast 410 to allow for material removal. Tilting may be accomplished by extending the bucket support cable 530 while simultaneously retracting the bucket control cables 505a,b (FIG. 12A) until the bucket tool 320 and the inner mast projections 415 meet. Once the bucket tool 320 reaches an upright orientation, the bucket support cable 530 and the bucket control cables 505a,b (FIG. 12A) may be tensioned to secure the bucket tool 320 in position for a debris 150 removal operation.

Figure 12C:
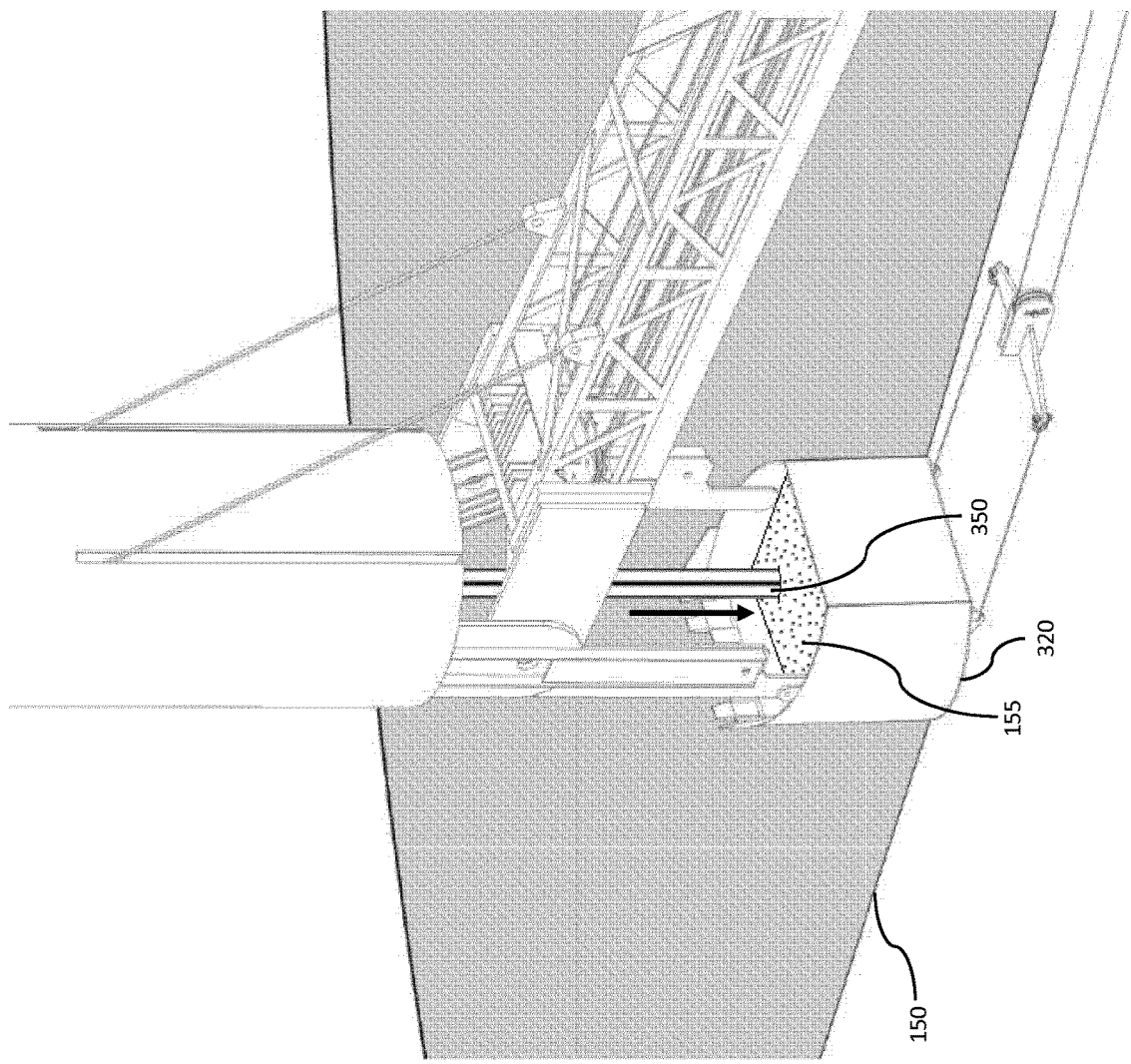
FIG. 12C depicts the bucket tool embodiment of FIG. 10A as it is being filled with water in a sluicing operation.

FIG. 12C depicts the bucket tool 320 as it is being filled with liquid in a sluicing operation. Other debris removal methods are possible. In the depicted embodiment, there are two hoses 350. One of the hoses 350 may be used to introduce water to the bucket tool 320 and the other may be used to pump the contents of the bucket tool 320 out of the tank. In some embodiments, the number of hoses or pipes in the system may vary depending on the nature and requirements of the particular application. In some embodiments, water or other substances may be introduced for the purpose of facilitating debris removal. In the depicted embodiment, liquid, such as water, may be pumped into the bucket tool 320 through one or more hoses 350 at such a rate as to cause the liquid to mix with the debris 150 resulting in slurry 155. Mixing in bucket tool 320 allows sluicing to be used without introducing liquid into the tank. In embodiments wherein the debris 150 is of a fluid enough state to be pumped out through the hoses 350, sluicing may be bypassed.

In embodiments where the debris is a dry particulate of sufficiently small average particle size, the debris may be vacuumed from the bucket tool 320. Both wet and dry debris removal operations are described in the incorporated documents—e.g., U.S. Pat. No. 10,290,384.

Figure 12D:
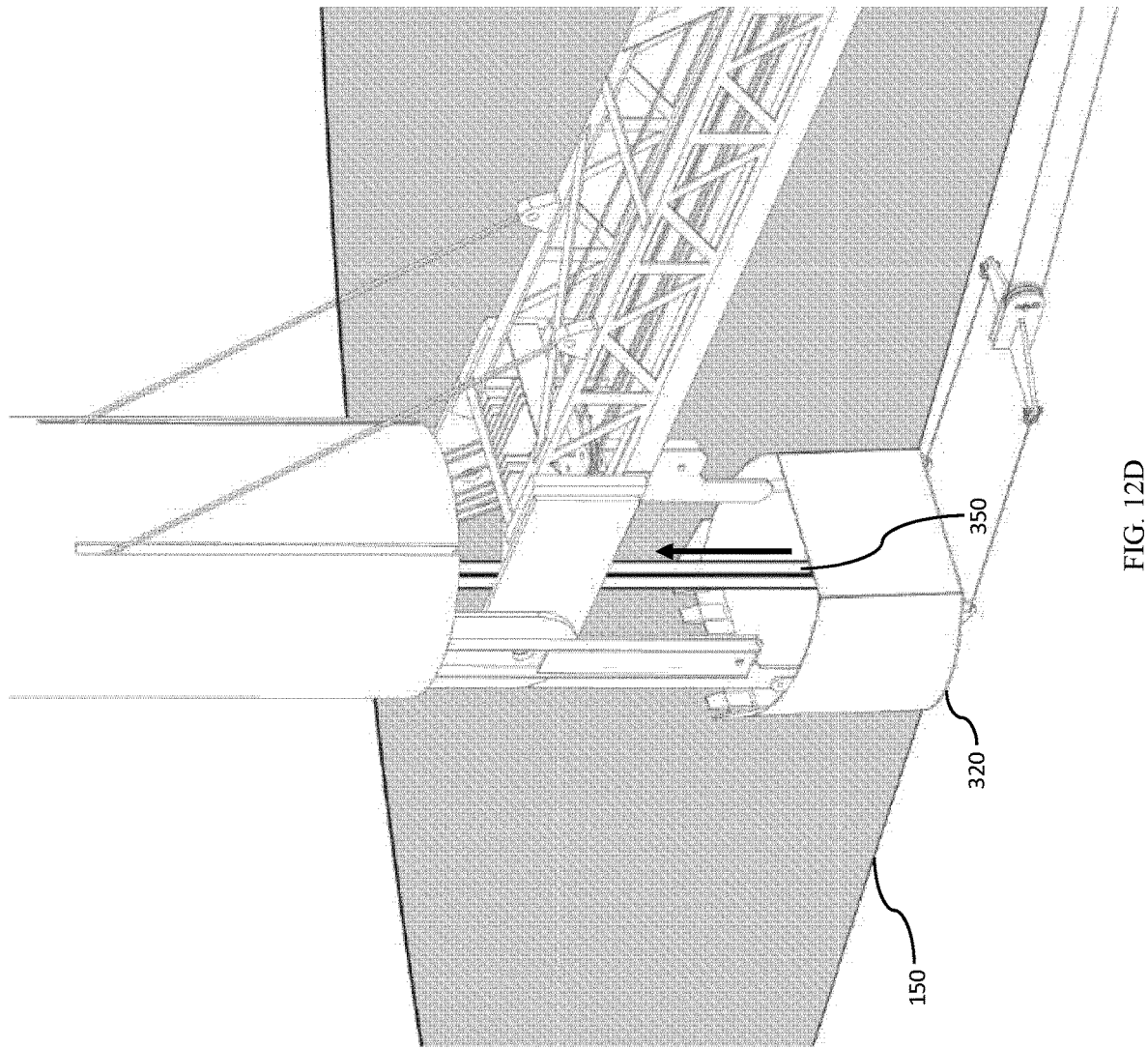
FIG. 12D depicts the bucket tool embodiment of FIG. 10A as the water and debris is being pumped from the bucket tool.

FIG. 12D depicts the completion of the sluicing operation wherein the slurry 155 (FIG. 12C) has been pumped from the bucket tool 320. During the sluicing operation, the slurry 155 (FIG. 12C) is pumped through hoses 350 that pass through the mast assembly to the outside of the tank. In some embodiments an additional operation may be implemented to remove debris buildup from the bottom of the bucket tool 320. Debris removal operations may be repeated until a sufficient quantity of debris 150 has been removed from the tank.

In some embodiments, the debris may be pumped from the bucket directly to a processing system where it may be processed on-site. One such processing system is described in the incorporated documents—e.g., U.S. Pat. No. 9,981,868. In some embodiments the debris may be pumped from the bucket to one or more vessels where it may be temporarily held until it is processed off-site. In some embodiments, the debris may be pumped from the bucket into one or more vessels for permanent or semi-permanent storage.

Sensing and Control

In some embodiments, the TCS comprises a plurality of one or more of cables, pulleys, rollers, and hoists to control motion of the arm assembly, raise and lower the inner mast, and position and control the clearing and removal tools. In the depicted embodiment, a plurality of hoists, cables, pulleys, and rollers are employed to facilitate and control motion of the various components.

Figure 13A:
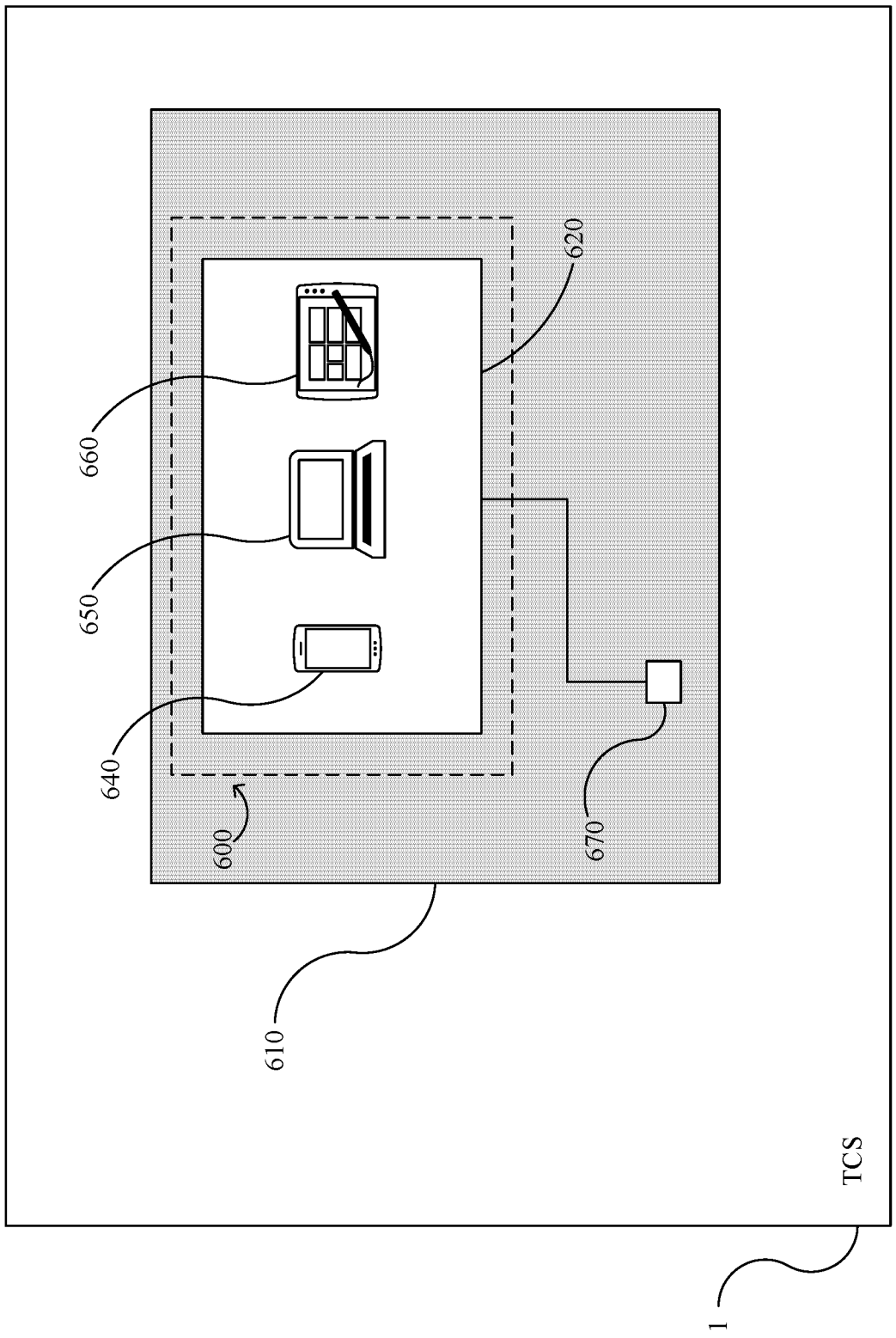
FIG. 13A is a schematic diagram of the TCS system of FIG. 1A including a computerized control system with an on-site control base station.
Figure 13B:
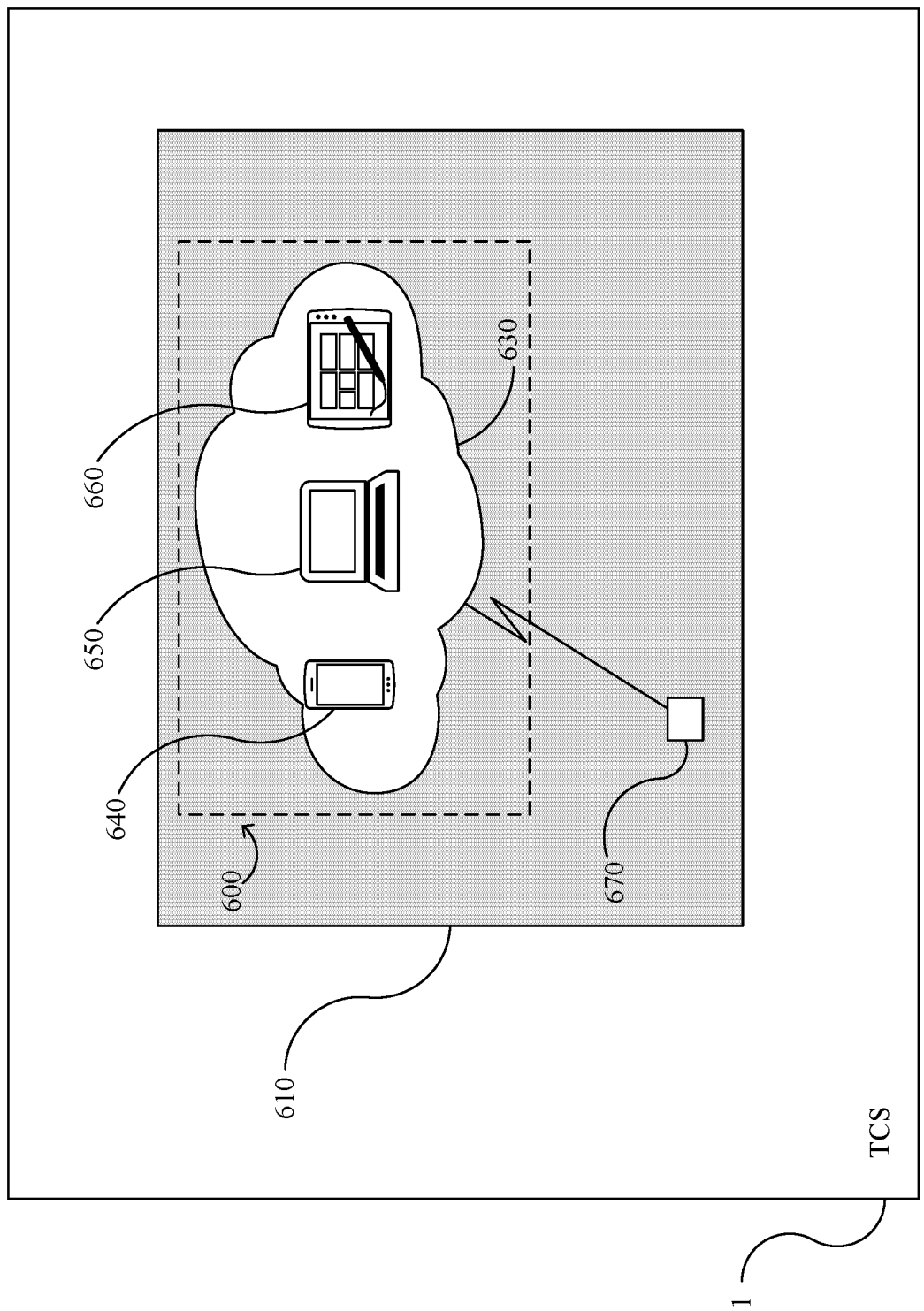
FIG. 13B is a schematic diagram of the TCS system of FIG. 1A including a computerized control system with a remove control base station.

The TCS may be controlled remotely and/or on-site. In some embodiments, the TCS is manually operated by one or more workers on-site. In some embodiments, and as illustrated in FIG. 13A and FIG. 13B, the TCS 1 includes a computerized control system 600. A computerized control system may comprise a control base station that is either an on-site control base station 620 as shown in FIG. 13A or a remote control base station 630 as shown in FIG. 13B and/or one or more mobile devices such as smart phones 640, laptops 650, and tablets 660.

In some embodiments the TCS may comprise one or more sensors 670. The one or more sensors may comprise one or more of contact sensors, non-contact sensors, capacitive sensors, inductive sensors, 3D imager, camera, thermal imager, thermometer, pressure sensor, accelerometer, inertial measurement unit (IMU), rotary encoder, radiation detector, LIDAR, and strain sensors, among others. In some embodiments, one or more sensors may be used to monitor strain, torque, and pressure at one or more locations in the system as a safety mechanism to prevent catastrophic failures. In some embodiments, one or more sensors may be used to determine the position of one of the clearing and removal tools and the end of the arm assembly to prevent it from contacting the walls of the tank. In some embodiments, one or more sensors may be used to determine the fill level of the bucket. In some embodiments one or more of the sensors are capable of functioning in radioactive and/or corrosive environments. Radioactive shielding 610 may be operatively provided for at least one of the computerized control system 600 and the one or more sensors 670.

In some embodiments the TCS may be used for tank inspection. Tank inspection embodiments may comprise one or more sensors as detailed above. In some embodiments, the tank may be inspected prior to the debris removal operation. The tank inspection step may yield data that may be used to pre-program the TCS to perform the debris removal operation automatically. In some embodiments, users may program an otherwise predetermined set of data into the TCS to perform the debris removal operation automatically. In some embodiments, the tank may be inspected after the debris removal operation to check for any remaining contaminants or debris.

Alternate Embodiments

The TCS may be applied to any type or style of tank including above-ground, underground, fluid-submersed, and partially buried tanks. The TCS may be used for operations other than those disclosed herein. The following section discusses several embodiments. It should be clear that various aspects from any one or more embodiments may be combined to form other embodiments not explicitly disclosed herein.

Tools

In some embodiments, a mechanically disturbing geometry may be incorporated into the scraping elements on the bucket tool, plow tool, or other tools. Some embodiments may include standalone scraping tools. In some applications tough sludge may accumulate on tank surfaces. Tough sludge can be removed by loosening or disturbing it with nub, bristle, track, brush, textured, or ribbed scraping elements. In some embodiments, a grated surface is used to loosen stuck on debris from tank surfaces. Some embodiments may combine ribs or tracks with holes that result in grating. Other embodiments may comprise flat surfaces with holes that act as grating and prevent gouging into tank surfaces. In some embodiments scraping and/or removal tools are flexible, or comprise portions that are flexible, such that they may conform to geometry in the tank such as sharp and filleted corners.

In some embodiments the tools may be consumable. Organic and/or consumable materials may reduce spark and heat generation which is important in highly caustic or reactive environments. In some embodiments consumable tools may be layered in series such that as one layer is consumed the next layer is exposed for use. Consumed tools may be removed from the tank in the same manner as the other debris. In some embodiments having harder, denser, debris additional tools may be incorporated to break the debris up and to chip it away from surfaces such as elliptical wheels that function in a similar manner to a tunnel boring machine and grinding spokes.

Stability

In some embodiments, a counterweight may be lowered, deployed, extended, or otherwise introduced to balance the arm assembly and reduce stress, strain, or breakage due to load imbalances. In some embodiments, the counterweight may be a duplicate arm assembly which may be used to carry out duplicate operations which may counteract a change in mass when the bucket tool on one arm assembly is filled.

Safety and Containment

In some embodiments, a cover or shield may be placed over or around the tank opening to prevent detritus, debris, or workers from falling into the tank. In some embodiments, the cover or shield may be transparent or netlike to allow workers to observe in-tank operations through the tank opening. In some embodiments, the cover or shield may be coupled to the outer mast.

In some embodiments, an off-gas system may be positioned at the tank opening to capture any potentially hazardous off-gases that may be released during debris removal. In some embodiments, additional components may be included to control the airflow from the tank and direct it into an off-gas system. In some embodiments, the off-gas system is further configured to process the captured off-gases on-site. A mobile off-gas processing system is described in the incorporated documents—e.g., U.S. Pat. No. 10,290,384.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

Having described and illustrated the principles of the systems, methods, processes, and/or apparatuses disclosed herein in a preferred embodiment thereof, it should be apparent that the systems, methods, processes, and/or apparatuses may be modified in arrangement and detail without departing from such principles. Claim is made to all modifications and variation coming within the spirit and scope of the following claims.

INCORPORATION BY REFERENCE

The entire content of each document listed below is incorporated by reference into this document (the documents below are collectively referred to as the "incorporated documents"). The incorporated materials are not necessarily "prior art" and Applicant expressly reserves the right to swear behind any of the incorporated materials.

Applicant believes the incorporated materials are "non-essential" in accordance with 37 CFR 1.57 because they are referred to for purposes of indicating the background or illustrating the state of the art. However, if the USPTO believes that any of the incorporated materials constitute "essential material" within the meaning of 37 CFR 1.57(c)(1)-(3), Applicant will amend the specification to expressly recite the essential material as allowed by the applicable rules.

U.S. Pat. Pub. No. 2017/0316844 (application Ser. No. 15/582,176), titled "Tank Cleaning System," filed on 28 Apr. 2017, published on 2 Nov. 2017.

U.S. Prov. App. No. 62/330,330, titled "Tank Cleaning System," filed on 2 May 2016.

U.S. Pat. No. 10,290,384 (application Ser. No. 15/012,101), titled "Ion Specific Media Removal From Vessel for Vitrification," filed on 1 Feb. 2016, issued on 14 May 2019.

U.S. Pat. No. 10,065,308 (application Ser. No. 14/975,544), titled "Systems and Methods for Chain Joint Cable Routing," filed on 18 Dec. 2015, issued on 4 Sep. 2018.

U.S. Pat. No. 9,981,868 (application Ser. No. 14/748,535), titled "Mobile Processing System for Hazardous and Radioactive Isotope Removal," filed on 24 Jun. 2015, issued on 29 May 2018.

The invention claimed is:

1. A robotic system used for inspection, maintenance, debris removal, and/or cleaning of environments that are hazardous and/or not suitable for human entry, the system comprising:
- a debris removal system comprising a bucket tool, a plow tool, and one or more hoses, wherein the one or more hoses are configured to transport debris from the bucket tool;
- an arm assembly comprising an outer arm and an inner arm, wherein the bucket tool is operably connected to the arm assembly;
- a trolley system operably connected to the arm assembly and comprising one or more rollers wherein the one or more rollers facilitate motion of the trolley system along a length of the arm assembly and wherein the plow tool is operably connected to the trolley system;
- a mast assembly comprising an outer mast, an inner mast, and a mast support base, wherein the inner mast has a central axis about which the arm assembly revolves; and
- a drive system connected to the trolley system, the arm assembly, and the mast assembly, the drive system comprising one or more of cables, pulleys, rollers, or hoists to at least one of control motion of the arm assembly, raise and lower the inner mast, or position at least one of the bucket tool or the plow tool.

2. The system of claim 1, further comprising an off-gas system operably configured to capture and process off-gases generated by at least one of the inspection, maintenance, debris removal, or cleaning of environments.

3. The system of claim 1, wherein the one or more hoses transport debris through the mast assembly to an on-site processing system.

4. The system of claim 1, further comprising a computerized control system comprising a control base station that is located on-site and/or remote, wherein the computerized control system controls functionality of the robotic system, wherein the computerized control system is connected to one or more mobile devices, wherein the one or more mobile devices include at least one of a smart phone, a laptop computer, a portable desktop computer station, or a tablet, and wherein the one or more mobile devices is configured to operate the computerized control system.

5. The system of claim 1, further comprising one or more sensors for detecting the volume of debris in the bucket tool, wherein the one or more sensors comprise one or more contact sensors, non-contact sensors, capacitive sensors, inductive sensors, 3D imager, camera, thermal imager, thermometer, pressure sensor, accelerometer, inertial measurement unit (IMU), rotary encoder, radiation detector, LIDAR, or strain sensors.

6. The system of claim 1, wherein the bucket tool is configured to scoop debris from the environment and is tiltable towards an upright position for debris removal from the bucket tool.

7. The system of claim 1, wherein the bucket tool is movable with respect to the arm assembly to a position beneath the inner mast.

8. The system of claim 1, further comprising an off-gas system operably configured to capture and process off-gases generated by at least one of the inspection, maintenance, debris removal, or cleaning of environments by passing the off-gases through one or more stages comprising one or more of filtration, wet scrubbing, final conditioning, and/or discharge.

9. The system of claim 1, wherein the one or more hoses transport debris through the mast assembly to an on-site processing system including one or more of a solids feed module, feed/blend module, solids removal filter module, an ultrafilter module, and/or ion specific media module.

10. A robotic system used for inspection, maintenance, debris removal, and/or cleaning of environments that are hazardous and/or not suitable for human entry, the system comprising:
- a mast assembly including an outer mast and an inner mast translatably connected to the outer mast, the inner mast defining a central axis along a length of the inner mast;
- a first arm pivotally connected to the mast assembly about a pivot axis, the pivot axis being perpendicular to the central axis of the inner mast;
- a second arm translatably connected to the first arm, wherein the first arm and the second arm are operable as an arm assembly;
- a trolley system operably connected to the arm assembly and comprising one or more rollers; wherein the one or more rollers facilitate motion of the trolley system along a length of the arm assembly;
- a plow coupled to the trolley system; and
- a bucket operably connected to the arm assembly and translatable relative to the arm assembly and moveable between a first state in which the bucket is configured to collect debris from the environment and a second state in which the bucket is configured with one or more hoses operably configured to transport debris from the bucket.

11. The system of claim 10, further comprising an off-gas system operably configured to capture and process off-gases generated by at least one of the inspection, maintenance, debris removal, and/or cleaning of environments.

12. The system of claim 10, wherein the one or more hoses transport debris through the mast assembly to an on-site processing system.

13. The system of claim 10, wherein:
the first arm pivots from a retracted position to a deployed position;
the first arm is generally parallel to the central axis of the inner mast in the retracted position; and
the first arm is generally perpendicular to the central axis of the inner mast in the deployed position.

14. The system of claim 10, wherein the first arm, the second arm, the plow, and the bucket are rotatable together about the central axis of the inner mast.

15. The system of claim 10, wherein the inner mast is telescopically connected to the outer mast.

16. The system of claim 10, wherein the second arm is telescopically connected to the first arm.

17. The system of claim 10, wherein:
extension of the second arm relative to the first arm includes moving the second arm by one or more arm extend cables; and
retraction of the second arm relative to the first arm includes moving the second arm by one or more arm retract cables.

18. The system of claim 10, further comprising an off-gas system operably configured to capture and process off-gases generated by at least one of the inspection, maintenance, debris removal, and/or cleaning of environments by passing the off-gases through one or more stages comprising one or more of filtration, wet scrubbing, final conditioning, and/or discharge.

19. The system of claim 10, wherein the one or more hoses transport debris through the mast assembly to an on-site processing system including one or more of a solids feed module, feed/blend module, solids removal filter module, an ultrafilter module, and/or ion specific media module.

\* \* \* \* \*